US012736862B2

(12) United States Patent
Sugiyama

(10) Patent No.: US 12,736,862 B2
(45) Date of Patent: Sep. 15, 2026

(54) LIGHT SOURCE DEVICE AND PROJECTOR

(71) Applicant: SEIKO EPSON CORPORATION, Tokyo (JP)

(72) Inventor: Nobuo Sugiyama, Azumino (JP)

(73) Assignee: SEIKO EPSON CORPORATION, Tokyo (JP)

(*) Notice: Subject to any disclaimer, the term of this patent is extended or adjusted under 35 U.S.C. 154(b) by 356 days.

(21) Appl. No.: 18/505,444

(22) Filed: Nov. 9, 2023

(65) Prior Publication Data

US 2024/0160093 A1 May 16, 2024

(30) Foreign Application Priority Data

Nov. 10, 2022 (JP) ................................ 2022-180251

(51) Int. Cl.

*G03B 21/16* (2006.01)
*G03B 21/14* (2006.01)
*G03B 21/20* (2006.01)

(52) U.S. Cl.

CPC ........... *G03B 21/16* (2013.01); *G03B 21/145* (2013.01); *G03B 21/204* (2013.01)

(58) Field of Classification Search

CPC .... G03B 21/16; G03B 21/145; G03B 21/204; G03B 21/2066; G03B 21/208; G03B 21/20

USPC ........................................................ 353/52

See application file for complete search history.

(56) References Cited

U.S. PATENT DOCUMENTS

| | | | | |
|---|---|---|---|---|
| 2019/0072243 A1* | 3/2019 | Egawa | ................. | H04N 9/3179 |
| 2020/0081334 A1* | 3/2020 | Egawa | ................... | G03B 21/20 |
| 2020/0241406 A1* | 7/2020 | Nojima | .............. | G03B 21/2066 |
| 2021/0041775 A1* | 2/2021 | Takagi | ................. | G03B 21/204 |
| 2021/0055640 A1* | 2/2021 | Miyashita | ............ | H04N 9/3141 |
| 2022/0342137 A1* | 10/2022 | Yu | ........................ | G02B 6/0003 |

FOREIGN PATENT DOCUMENTS

| | | | | |
|---|---|---|---|---|
| JP | 2010238449 A | * 10/2010 | ................ | F21S 2/00 |
| WO | WO2020/254455 A | 12/2020 | | |

* cited by examiner

*Primary Examiner* — Magda Cruz
(74) *Attorney, Agent, or Firm* — Dority & Manning, P.A.

(57) ABSTRACT

A light source device according to the present disclosure includes a light emitting element, a substrate having a first surface and a second surface, a wavelength conversion member which includes a phosphor, a support member having a third surface having contact with the first surface of the substrate, and a fourth surface located at an opposite side to the third surface, and configured to support the wavelength conversion member, a fixation member configured to fix the support member to the substrate, and a spacer member having contact with each of the substrate and the wavelength conversion member to hold the light emitting element and the wavelength conversion member at positions separated from each other. The fixation member is configured including an elastic member, and is configured to fix the support member to the substrate in a state of pressing the third surface toward the first surface.

20 Claims, 11 Drawing Sheets

FIG. 1

71
51
55
78
B
68
VII
65
54
72
100
50
65
Z
Y
X
VII 54c
71
55
55a
75
78
54
76
65
74
X Z
Y 120
68
72
71h
44n
44f
44m
55h
44c
56
71
55b
55
55a
51
49
67
47
44h
46
50f
44
50e
44j
50
44d

LIGHT SOURCE DEVICE AND PROJECTOR

The present application is based on, and claims priority from JP Application Serial Number 2022-180251, filed Nov. 10, 2022, the disclosure of which is hereby incorporated by reference herein in its entirety.

BACKGROUND

1. Technical Field

The present disclosure relates to a light source device and a projector.

2. Related Art

As a light source device used for a projector, there is proposed a light source device using fluorescence emitted from a phosphor when irradiating the phosphor with excitation light emitted from a light emitting element.

In International Patent Publication No. WO 2020/254455 (Document 1), there is disclosed a light source device provided with a light emitting diode (LED) for emitting excitation light, a phosphor shaped like a rod for converting the excitation light into fluorescence, and a holder for supporting the phosphor. The phosphor is fixed to the holder with a member shaped like a wire. Further, a support substrate of the LED and the holder are directly fixed to each other with a screw.

In the light source device of Document 1, the holder functions as a heat radiation member which releases the heat generated in the phosphor to the outside to thereby prevent a rise in temperature of the phosphor. Therefore, it is desirable for the phosphor to adhere to the holder with appropriate force. However, when the adhesive force of the phosphor is lower than a predetermined value, since the heat of the phosphor is not sufficiently transferred, the temperature of the phosphor rises, and thus, there is a possibility that the fluorescence having an intended intensity cannot be obtained. In contrast, when the adhesive force of the phosphor is higher than the predetermined value, an excessive load is applied to the phosphor, and there is a possibility that the phosphor is damaged depending on circumstances. Further, in order to efficiently transfer the heat of the phosphor to the holder, there is desired a configuration of fixing the phosphor to the holder without an intervention of an adhesive.

In the light source device of Document 1, the phosphor is fixed to the holder by making a rib of the support substrate of the LED have contact with the phosphor, and then screwing the support substrate and the holder to each other. However, when a dimension error occurs when manufacturing the phosphor or the rib, there is a possibility that there occurs a problem that the force with which the rib presses the phosphor is too strong or too weak, a problem that the rib fails to have contact with the phosphor depending on circumstances, or the like. Therefore, it is desired to provide a light source device in which the fluorescence having an intended intensity can stably be obtained irrespective of dimension errors of a variety of members, and which is excellent in reliability.

SUMMARY

In view of the problems described above, the light source device according to an aspect of the present disclosure includes a light emitting element configured to emit first light having a first wavelength band, a substrate having a first surface on which the light emitting element is arranged, and a second surface located at an opposite side to the first surface, a wavelength conversion member which includes a phosphor, and which is configured to convert the first light emitted from the light emitting element into second light having a second wavelength band different from the first wavelength band, a support member having a third surface having contact with the first surface of the substrate, and a fourth surface located at an opposite side to the third surface, and configured to support the wavelength conversion member, a fixation member configured to fix the support member to the substrate, and a spacer member having contact with each of the substrate and the wavelength conversion member to hold the light emitting element and the wavelength conversion member at positions separated from each other. The fixation member is configured including an elastic member, and is configured to fix the support member to the substrate in a state of pressing the third surface toward the first surface.

A projector according to an aspect of the present disclosure includes the light source device according to one of the aspects of the present disclosure, a light modulation device configured to modulate the light emitted from the light source device in accordance with image information, and a projection optical device configured to project the light modulated by the light modulation device.

BRIEF DESCRIPTION OF THE DRAWINGS

FIG. 1 is a schematic configuration diagram of a projector according to a first embodiment.

DESCRIPTION OF EXEMPLARY EMBODIMENTS

First Embodiment

Figure 2:
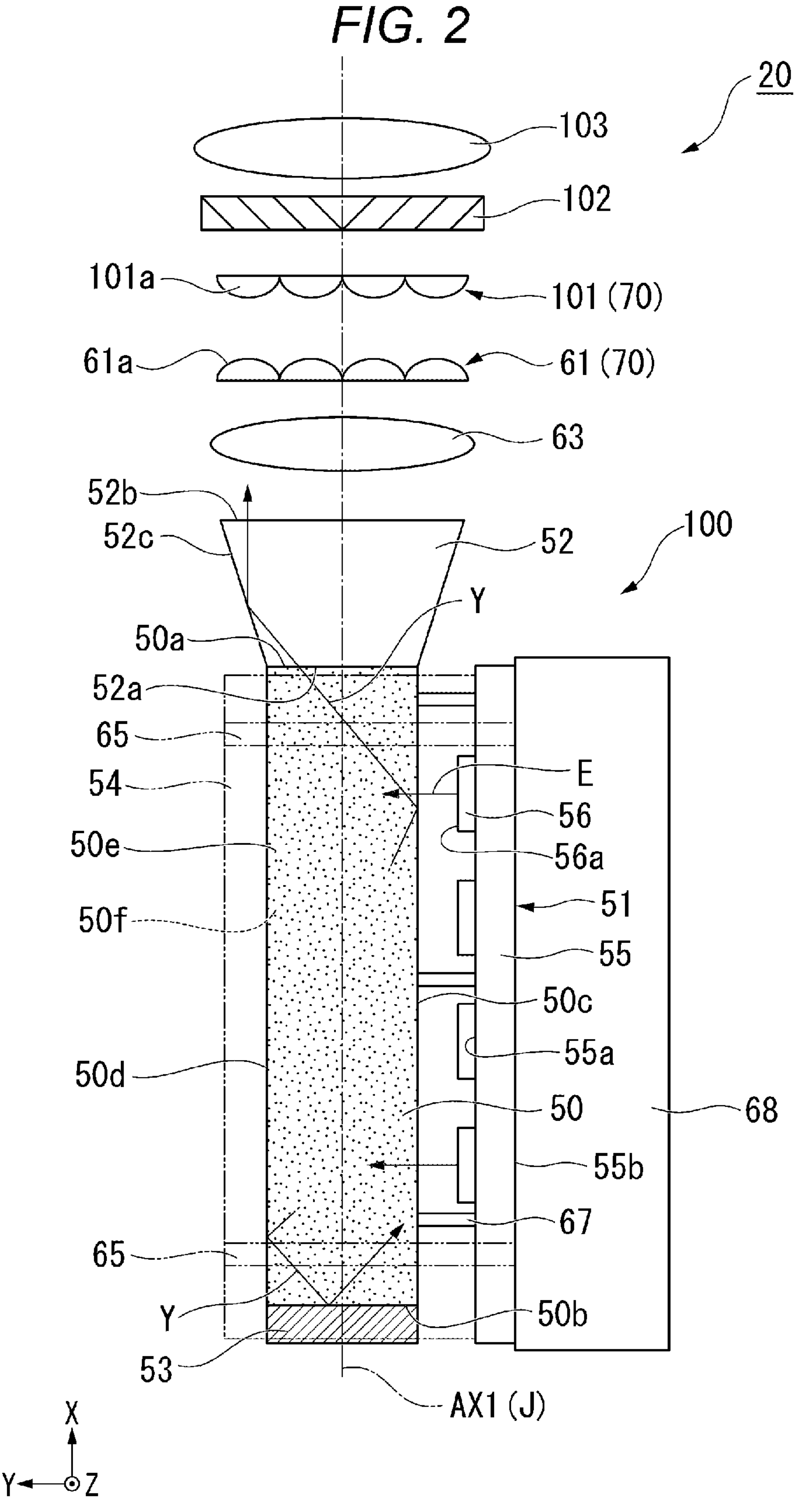
FIG. 2 is a schematic configuration diagram of a first illumination device according to the first embodiment.

A first embodiment of the present disclosure will hereinafter be described using the drawings.

A projector according to the present embodiment is an example of a projector using liquid crystal panels as light modulation devices.

In the drawings described below, constituents are shown with respective dimensional scale ratios different from each other in some cases in order to make the constituents eye-friendly.

Figure 1:
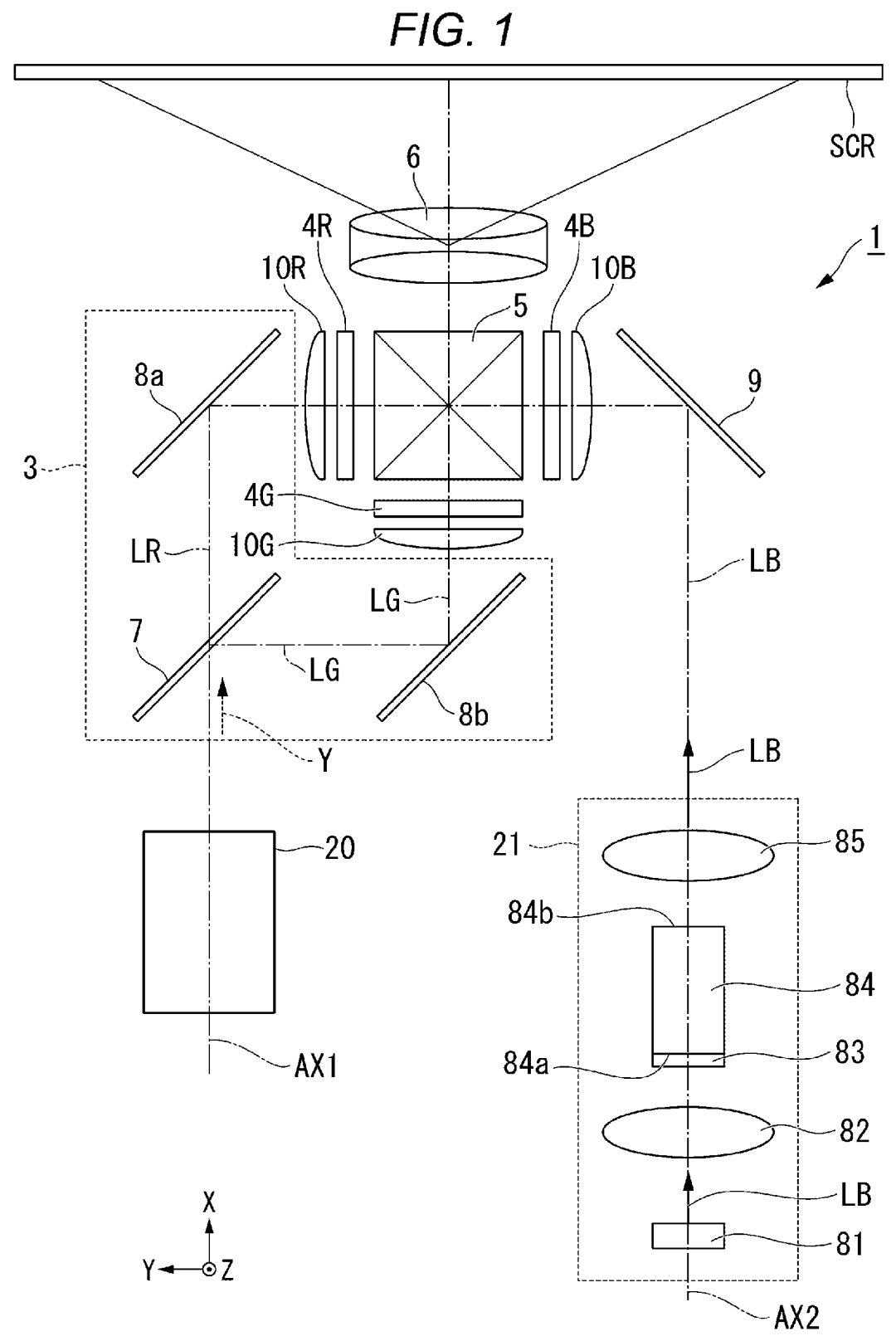

FIG. 1 is a diagram showing a schematic configuration of the projector 1 according to the present embodiment.

As shown in FIG. 1, the projector 1 according to the present embodiment is a projection-type image display device for displaying a color image on a screen (a projection target surface) SCR. The projector 1 is provided with three light modulation devices corresponding to respective colored light, namely red light LR, green light LG, and blue light LB.

The projector 1 is provided with a first illumination device 20, a second illumination device 21, a color separation optical system 3, a light modulation device 4R, a light modulation device 4G, a light modulation device 4B, a light combining element 5, and a projection optical device 6.

The first illumination device 20 emits fluorescence Y having a yellow color toward the color separation optical system 3. The second illumination device 21 emits the blue light LB toward the light modulation device 4B. The detailed configurations of the first illumination device 20 and the second illumination device 21 will be described later.

Hereinafter, in the drawings, the explanation will be presented using an XYZ orthogonal coordinate system as needed. A Z axis is an axis extending along a vertical direction of the projector 1. An X axis is an axis parallel to an optical axis AX1 of the first illumination device 20 and an optical axis AX2 of the second illumination device 21. A Y axis is an axis perpendicular to the X axis and the Z axis. The optical axis AX1 of the first illumination device 20 is a central axis of the fluorescence Y emitted from the first illumination device 20. The optical axis AX2 of the second illumination device 21 is a central axis of the blue light LB emitted from the second illumination device 21.

The color separation optical system 3 separates the fluorescence Y having the yellow color emitted from the first illumination device 20 into the red light LR and the green light LG. The color separation optical system 3 is provided with a dichroic mirror 7, a first reflecting mirror 8*a*, and a second reflecting mirror 8*b*.

The dichroic mirror 7 separates the fluorescence Y into the red light LR and the green light LG. Specifically, the dichroic mirror 7 transmits the red light LR, and reflects the green light LG. The second reflecting mirror 8*b* is arranged in a light path of the green light LG. The second reflecting mirror 8*b* reflects the green light LG, which has been reflected by the dichroic mirror 7, toward the light modulation device 4G. The first reflecting mirror 8*a* is arranged in a light path of the red light LR. The first reflecting mirror 8*a* reflects the red light LR, which has been transmitted through the dichroic mirror 7, toward the light modulation device 4R.

The blue light LB emitted from the second illumination device 21 is reflected by a reflecting mirror 9 toward the light modulation device 4B.

A configuration of the second illumination device 21 will hereinafter be described.

The second illumination device 21 is provided with a light source unit 81, a condenser lens 82, a diffuser plate 83, a rod lens 84, and a relay lens 85. The light source unit 81 is formed of at least one semiconductor laser. The light source unit 81 emits the blue light LB consisting of a laser beam. It should be noted that the light source unit 81 can also be formed of an LED for emitting blue light besides the semiconductor laser.

The condenser lens 82 is formed of a convex lens. The condenser lens 82 makes the blue light LB emitted from the light source unit 81 enter the diffuser plate 83 in a state in which the blue light LB emitted from the light source unit 81 is substantially converged. The diffuser plate 83 diffuses the blue light LB emitted from the condenser lens 82 at a predetermined diffusion angle to generate the blue light LB having a substantially homogenous light distribution similarly to the fluorescence Y emitted from the first illumination device 20. As the diffuser plate 83, there is used, for example, obscured glass made of optical glass.

The blue light LB diffused by the diffuser plate 83 enters the rod lens 84. The rod lens 84 has a prismatic shape extending along a direction of the optical axis AX2 of the second illumination device 21. The rod lens 84 has an end plane of incidence of light 84*a* disposed at one end, and a light exit end surface 84*b* disposed at the other end. The diffuser plate 83 is fixed to the end plane of incidence of light 84*a* of the rod lens 84 via an optical adhesive (not shown). It is desirable to make the refractive index of the diffuser plate 83 and the refractive index of the rod lens 84 coincide with each other as precise as possible.

The blue light LB propagates through the rod lens 84 while being totally reflected to thereby be emitted from the light exit end surface 84*b* in a state in which homogeneity of the illuminance distribution is enhanced. The blue light LB emitted from the rod lens 84 enters the relay lens 85. The relay lens 85 makes the blue light LB having been enhanced in homogeneity of the illuminance distribution by the rod lens 84 enter the reflecting mirror 9.

The shape of the light exit end surface 84*b* of the rod lens 84 is a rectangular shape substantially similar to a shape of an image formation area of the light modulation device 4B. Thus, the blue light LB emitted from the rod lens 84 efficiently enters the image formation area of the light modulation device 4B.

The light modulation device 4R modulates the red light LR in accordance with image information to form image light corresponding to the red light LR. The light modulation device 4G modulates the green light LG in accordance with the image information to form image light corresponding to the green light LG. The light modulation device 4B modulates the blue light LB in accordance with the image information to form image light corresponding to the blue light LB.

In each of the light modulation devices 4R, 4G, and 4B, there is used, for example, a transmissive liquid crystal panel. Further, on the incident side and the exit side of each of the liquid crystal panels, there are respectively arranged polarization plates (not shown). The polarization plate transmits only linearly-polarized light of a specific direction.

At the incident side of the light modulation device 4R, there is arranged a field lens 10R. At the incident side of the light modulation device 4G, there is arranged a field lens 10G. At the incident side of the light modulation device 4B, there is arranged a field lens 10B. The field lens 10R collimates a principal ray of the red light LR entering the light modulation device 4R. The field lens 10G collimates a principal ray of the green light LG entering the light modulation device 4G. The field lens 10B collimates a principal ray of the blue light LB entering the light modulation device 4B.

The light combining element 5 combines the image light corresponding to the red light LR, the image light corresponding to the green light LG, and the image light corresponding to the blue light LB with each other in response to incidence of the image light emitted from the light modulation device 4R, the image light emitted from the light modulation device 4G, and the image light emitted from the light modulation device 4B, and then emits the image light thus combined toward the projection optical device 6. As the light combining element 5, there is used, for example, a cross dichroic prism.

The projection optical device 6 is constituted by a plurality of projection lenses. The projection optical device 6 projects the image light having been combined by the light combining element 5 toward the screen SCR in an enlarged manner. Thus, an image is displayed on the screen SCR.

A configuration of the first illumination device 20 will hereinafter be described.

FIG. 2 is a schematic configuration diagram of the first illumination device 20.

As shown in FIG. 2, the first illumination device 20 is provided with a light source device 100, a collimating optical system 63, an integrator optical system 70, a polarization conversion element 102, and a superimposing optical system 103.

Figure 3:
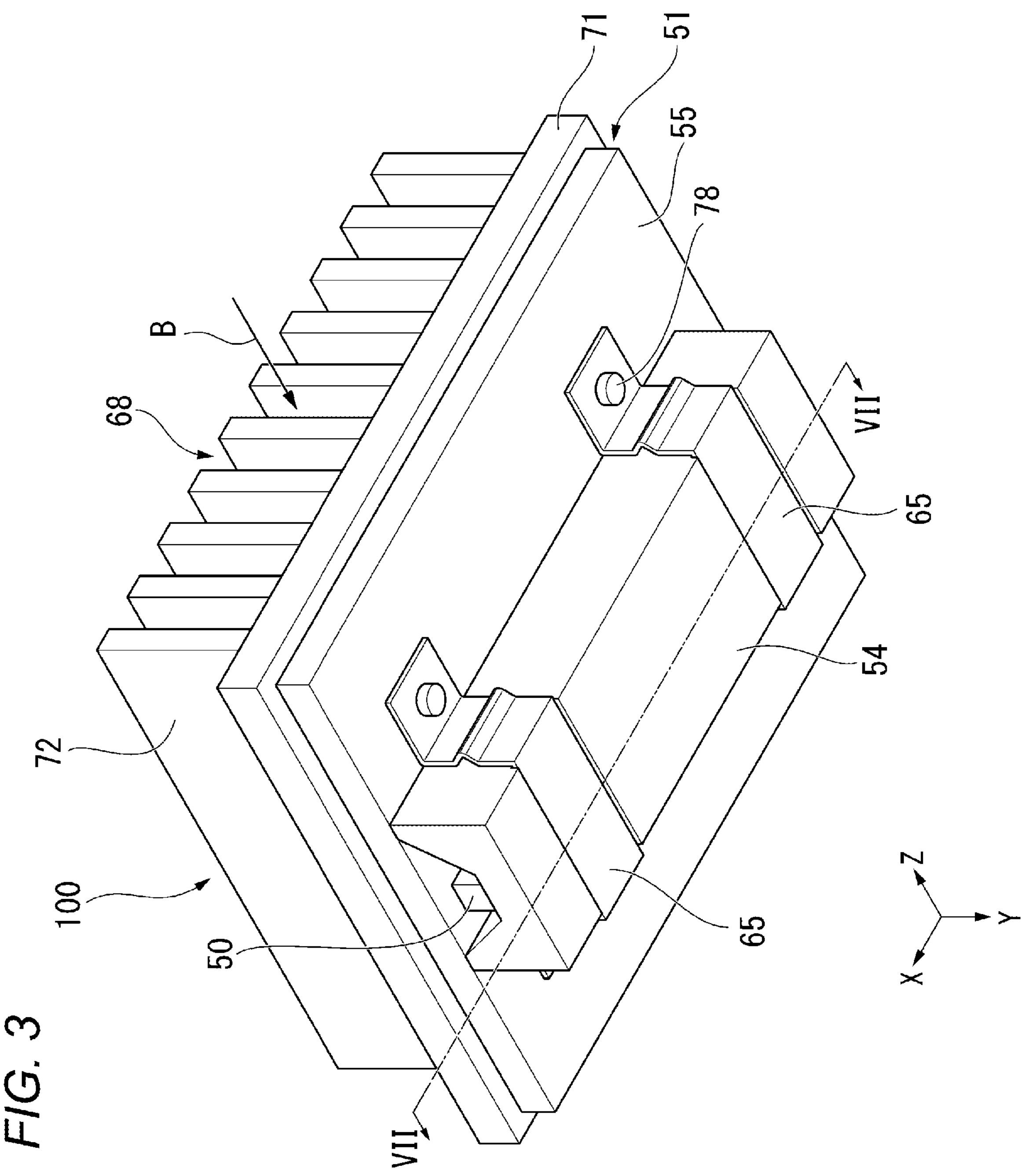
FIG. 3 is a perspective view of a light source device.
Figure 4:
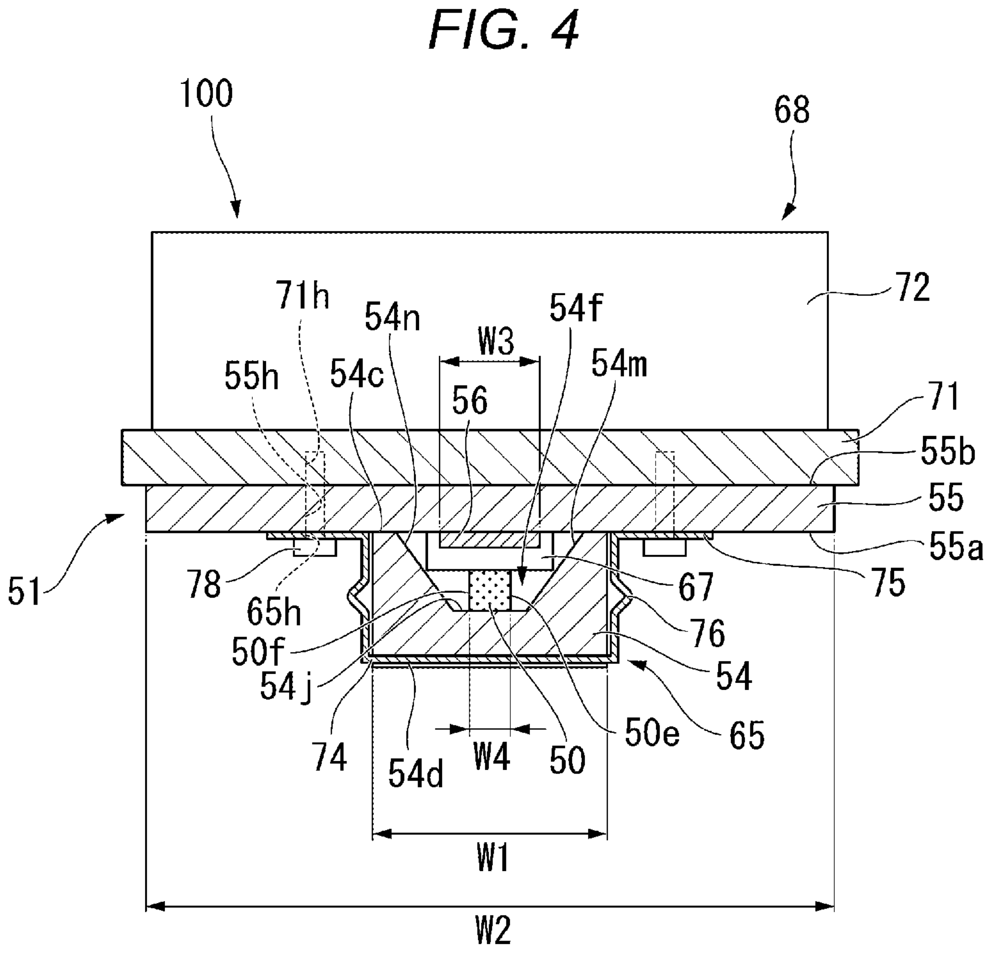
FIG. 4 is a front view of the light source device.
Figure 4:
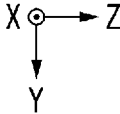
Figures 5, 6:
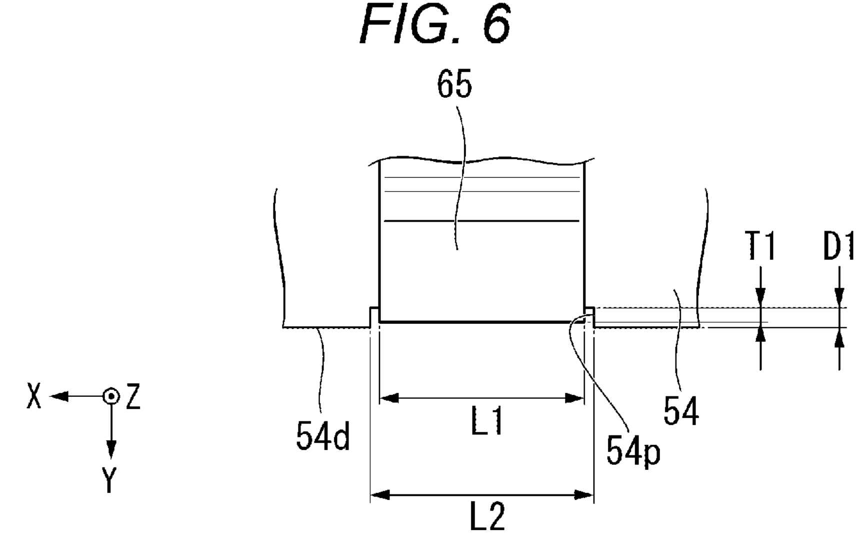
FIG. 5 is a side view of the light source device.
FIG. 6 is an enlarged view of an area indicated by a reference symbol A in FIG. 5.
Figure 7:
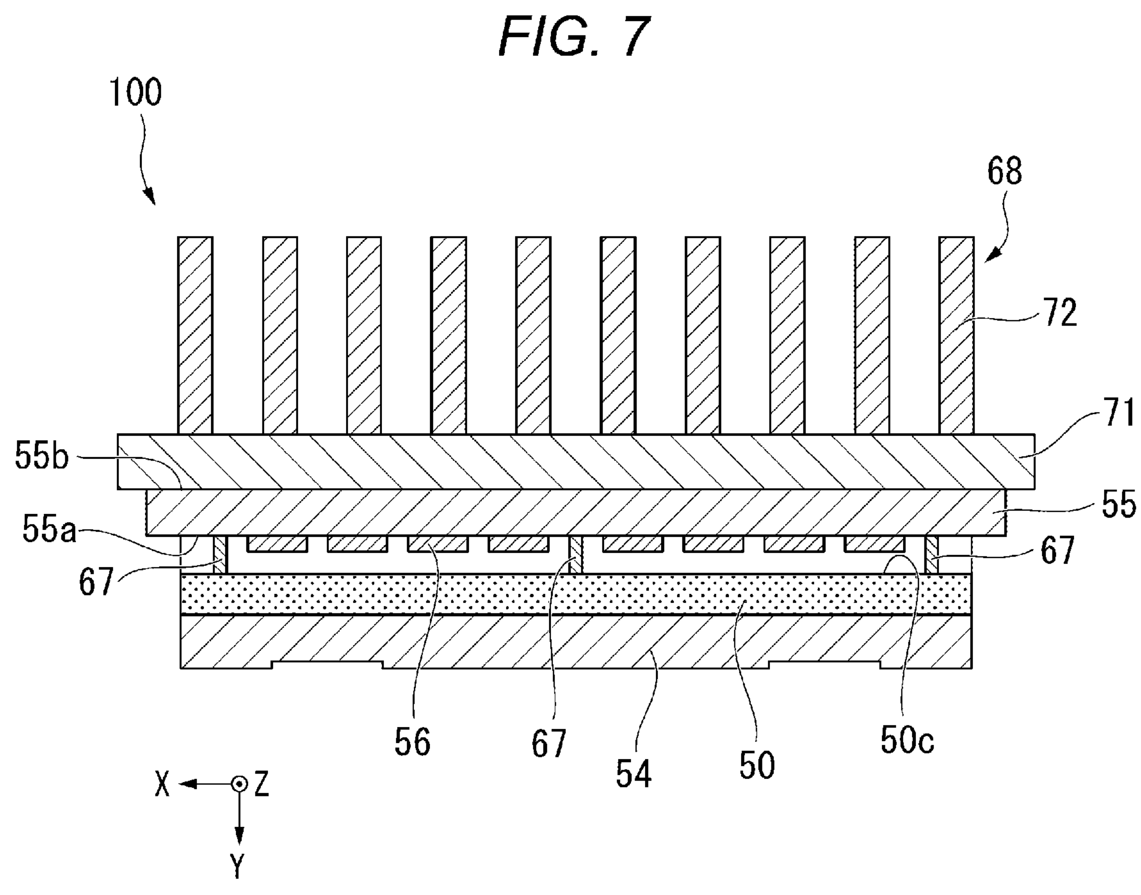
FIG. 7 is a cross-sectional view of the light source device along the line VII-VII in FIG. 3.

FIG. 3 is a perspective view of the light source device 100. FIG. 4 is a front view of the light source device 100. FIG. 5 is a side view of the light source device 100. FIG. 6 is an enlarged view of an area indicated by a reference symbol A in FIG. 5. FIG. 7 is a cross-sectional view of the light source device 100 along the line VII-VII in FIG. 3. It should be noted that in FIG. 3 through FIG. 7, illustration of an angle conversion member 52 is omitted in order to make the drawing eye-friendly.

As shown in FIG. 2 through FIG. 7, the light source device 100 is provided with a wavelength conversion member 50, a light source unit 51, the angle conversion member 52, a mirror 53, a support member 54, fixation members 65, spacer members 67, and a second heatsink 68. The light source unit 51 is provided with a substrate 55 and light emitting elements 56.

The wavelength conversion member 50 has a quadrangular prismatic shape extending in the X-axis direction, and has six faces. A side extending in the X-axis direction of the wavelength conversion member 50 is longer than a side extending in the Y-axis direction and a side extending in the Z-axis direction. Therefore, the X-axis direction corresponds to a long axis direction of the wavelength conversion member 50. The length of the side extending in the Y-axis direction and the length of the side extending in the Z-axis direction are equal to each other. In other words, a cross-sectional shape of the wavelength conversion member 50 cut by a plane (the Y-Z plane) perpendicular to the X-axis direction is a square. The length in the X-axis direction of the wavelength conversion member 50 is in a range of, for example, about 40 mm through 70 mm. The length of a side of the square as the cross-sectional shape of the wavelength conversion member 50 is in a range of, for example, about 1.0 mm through 1.5 mm. It should be noted that the cross-sectional shape of the wavelength conversion member 50 cut by the plane perpendicular to the X-axis direction can be a rectangle.

As shown in FIG. 2, the wavelength conversion member 50 has a first end surface 50*a* and a second end surface 50*b*, a first side surface 50*c* and a second side surface 50*d*, and a third side surface 50*e* and a fourth side surface 50*f*. The first end surface 50*a* and the second end surface 50*b* cross the long axis direction (the X-axis direction) of the wavelength conversion member 50, and are located at respective sides opposite to each other. The first side surface 50*c* and the second side surface 50*d* cross the first end surface 50*a* and the second end surface 50*b*, and are located at respective sides opposite to each other in the Y-axis direction. The third side surface 50*e* and the fourth side surface 50*f* cross the first side surface 50*c* and the second side surface 50*d*, and are located at respective sides opposite to each other in the Z-axis direction. In the following description, the first side surface 50*c*, the second side surface 50*d*, the third side surface 50*e*, and the fourth side surface 50*f* are collectively referred to as side surfaces in some cases.

The wavelength conversion member 50 includes a phosphor, and converts excitation light E having a first wavelength band into the fluorescence Y having a second wavelength band different from the first wavelength band. The excitation light E enters the wavelength conversion member 50 from the first side surface 50*c*. The fluorescence Y is guided inside the wavelength conversion member 50, and is then emitted from the first end surface 50*a*. The excitation light E in the present embodiment corresponds to first light in the appended claims. The fluorescence Y in the present embodiment corresponds to second light in the appended claims.

The wavelength conversion member 50 includes a ceramic phosphor made of a polycrystalline phosphor for wavelength-converting the excitation light E into the fluorescence Y. The second wavelength band provided to the fluorescence Y is a yellow wavelength band of, for example, 490 through 750 nm. In other words, the fluorescence Y is yellow fluorescence including a red light component and a green light component.

It is also possible for the wavelength conversion member 50 to include a single-crystal phosphor instead of the polycrystalline phosphor. Alternatively, the wavelength conversion member 50 can also be formed of fluorescent glass. Alternatively, the wavelength conversion member 50 can also be formed of a material obtained by dispersing a number of phosphor particles in a binder made of glass or resin. The wavelength conversion member 50 made of such a material converts the excitation light E into the fluorescence Y.

Specifically, the material of the wavelength conversion member 50 includes, for example, an yttrium aluminum garnet (YAG) phosphor. Citing YAG:Ce including cerium (Ce) as an activator agent as an example, as the material of the wavelength conversion member 50, there is used a material obtained by mixing raw powder including constituent elements such as $Y_2O_3$, $Al_2O_3$, and $CeO_3$ to cause the solid-phase reaction, Y—Al—O amorphous particles obtained by a wet process such as a coprecipitation process or a sol-gel process, and YAG particles obtained by a gas-phase process such as a spray drying process, a flame heat decomposition process, or a thermal plasma process.

The light source unit 51 is provided with the light emitting elements 56 each having a light emitting surface 56*a* for emitting the excitation light E in the first wavelength band. The light emitting elements 56 are each formed of, for example, an LED. The light emitting surface 56*a* of the light emitting element 56 is opposed to the first side surface 50*c* of the wavelength conversion member 50, and emits the excitation light E toward the first side surface 50*c*. The first wavelength band is a wavelength band from a violet color to a blue color of, for example, 400 nm through 480 nm, and has a peak wavelength of, for example, 445 nm. As described above, the light source unit 51 is disposed so as to be opposed to one of the four side surfaces along the longitudinal direction of the wavelength conversion member 50.

The substrate 55 supports the light emitting elements 56. The substrate 55 has a first surface 55*a* on which the light emitting elements 56 are arranged, and a second surface 55*b* located at an opposite side to the first surface. On the substrate 55, there can be directly formed a drive circuit for driving the light emitting elements using printing or the like, or there can be coupled a circuit board having the drive circuit. The light source unit 51 is constituted by the light emitting elements 56 and the substrate 55 in the case of the present embodiment, but can also be provided with other optical members such as a light guide plate, a diffuser plate, or a lens besides the above. In the present embodiment, although the light source unit 51 has the plurality of light emitting elements 56 in the present embodiment, the number of the light emitting elements 56 can be one, and is not particularly limited.

The support member 54 is disposed so as to surround the wavelength conversion member 50. The support member 54 supports the wavelength conversion member 50. Further, the support member 54 receives the heat generated by the wavelength conversion member 50, and then transfers the heat to the substrate 55. Therefore, it is desirable for the support member 54 to be formed of a material which has predetermined strength and is high in thermal conductivity. As the material of the support member 54, there is used metal such as aluminum or stainless steel, and in particular, an aluminum alloy such as 6061 aluminum alloy is desirably used. A specific configuration of the support member 54 will be described later.

The fixation members 65 fix the support member 54 to the substrate 55. In other words, the fixation members 65 regulate a translation of the support member 54 with respect to the substrate 55. The fixation members 65 are disposed at a plurality of places along the long axis direction of the wavelength conversion member 50. In the case of the present embodiment, the fixation members 65 are disposed at two places at a side near to the first end surface 50*a* of the wavelength conversion member 50 and at a side near to the second end surface 50*b*. It should be noted that these positions are not necessarily a limitation, and it is possible arrange the fixation members 65 at, for example, a central portion in the long axis direction of the wavelength conversion member 50. The number of the fixation members 65 is not particularly limited. A specific configuration of the fixation members 65 will be described later.

As shown in FIG. 2, the mirror 53 is provided to the second end surface 50*b* of the wavelength conversion member 50. The mirror 53 reflects the fluorescence Y which has been guided inside the wavelength conversion member 50, and has reached the second end surface 50*b* to thereby guide the fluorescence Y toward the first end surface 50*a*. The mirror 53 is constituted by a metal film or a dielectric multilayer film formed on the second end surface 50*b* of the wavelength conversion member 50. Alternatively, the mirror 53 can be constituted by a member separated from the wavelength conversion member 50, and can be bonded to the second end surface 50*b*.

In the first illumination device 20, when the excitation light E emitted from the first light source unit 51 enters the wavelength conversion member 50, the phosphor included inside the wavelength conversion member 50 is excited, and the fluorescence Y is emitted from an arbitrary light emitting point. The fluorescence Y proceeds from the arbitrary light emitting point toward all directions, but the fluorescence Y having proceeded toward one of the four side surfaces 50*c*, 50*d*, 50*e*, and 50*f* proceeds toward the first end surface 50*a* or the second end surface 50*b* while repeating total reflection at a plurality of places on the side surfaces 50*c*, 50*d*, 50*e*, and 50*f*. The fluorescence Y proceeding toward the first end surface 50*a* enters the angle conversion member 52. The fluorescence Y proceeding toward the second end surface 50*b* is reflected by the mirror 53, and then proceeds toward the first end surface 50*a*.

A part of the excitation light E which has not been used for the excitation of the phosphor out of the excitation light E having entered the wavelength conversion member 50 is reflected by a member on the periphery of the wavelength conversion member 50 including the light emitting elements 56 of the light source unit 51, or the mirror 53 disposed on the second end surface 50*b*. Therefore, the part of the excitation light E is confined inside the wavelength conversion member 50 to be reused.

The angle conversion member 52 is disposed at the light exit side of the first end surface 50*a* of the wavelength conversion member 50. The angle conversion member 52 is formed of, for example, a taper rod. The angle conversion member 52 has a plane of incidence of light 52*a* which the fluorescence Y emitted from the wavelength conversion member 50 enters, a light exit surface 52*b* for emitting the fluorescence Y, and a side surface 52*c* for reflecting the fluorescence Y having entered the side surface 52*c*, toward the light exit surface 52*b*.

The angle conversion member 52 has a truncated quadrangular pyramid-like shape, and the area of a cross-section perpendicular to an optical axis J increases along the proceeding direction of the light. Therefore, the area of the light exit surface 52*b* is larger than the area of the plane of incidence of light 52*a*. An axis which passes through the center of the light exit surface 52*b* and the center of the plane of incidence of light 52*a*, and which is parallel to the X axis, is defined as the optical axis J of the angle conversion member 52. It should be noted that the optical axis J of the angle conversion member 52 coincides with the optical axis AX1 of the first illumination device 20.

The fluorescence Y having entered the angle conversion member 52 changes the direction so as to approximate to a direction parallel to the optical axis J every time the fluorescence Y is totally reflected by the side surface 52*c* while proceeding inside the angle conversion member 52. In such a manner, the angle conversion member 52 converts an exit angle distribution of the fluorescence Y emitted from the first end surface 50*a* of the wavelength conversion member 50. Specifically, the angle conversion member 52 makes a maximum exit angle of the fluorescence Y on the light exit surface 52*b* smaller than a maximum incident angle of the fluorescence Y on the plane of incidence of light 52*a*.

In general, since an etendue of light defined by a product of the area of a light exit region and a solid angle (the maximum exit angle) of the light is conserved, the etendue of the fluorescence Y is also conserved before and after the transmission through the angle conversion member 52. As described above, the angle conversion member 52 has the configuration in which the area of the light exit surface 52*b* is made larger than the area of the plane of incidence of light 52*a*. Therefore, in view of the conservation of the etendue, it is possible for the angle conversion member 52 to make the maximum exit angle of the fluorescence Y on the light exit surface 52*b* smaller than the maximum incident angle of the fluorescence Y on the plane of incidence of light 52*a*. In such a manner, the angle conversion member 52 functions as a concentrator.

The angle conversion member 52 is fixed to the wavelength conversion member 50 via an optical adhesive (not shown) so that the plane of incidence of light 52*a* is opposed to the first end surface 50*a* of the wavelength conversion member 50. Specifically, the angle conversion member 52 and the wavelength conversion member 50 have contact with each other via the optical adhesive, and no air gap (no air layer) is disposed between the angle conversion member 52 and the wavelength conversion member 50. When an air gap is supposedly disposed between the angle conversion member 52 and the wavelength conversion member 50, the fluorescence Y having entered the plane of incidence of light 52*a* of the angle conversion member 52 at an angle no smaller than a critical angle out of the fluorescence Y having reached the plane of incidence of light 52*a* is totally reflected by the plane of incidence of light 52*a*, and fails to enter the angle conversion member 52. In contrast, when such an air gap is not disposed between the angle conversion member 52 and the wavelength conversion member 50 as in the present embodiment, it is possible to reduce the fluorescence Y which cannot enter the angle conversion member 52. From this point of view, it is desirable to make the refractive index of the angle conversion member 52 and the refractive index of the wavelength conversion member 50 coincide with each other as precisely as possible.

It is also possible to use a compound parabolic concentrator (CPC) instead of the taper rod as the angle conversion member 52. Even when using the CPC as the angle conversion member 52, it is also possible to obtain substantially the same advantages as those obtained when using the taper rod. It should be noted that the light source device 100 is not necessarily required to be provided with the angle conversion member 52.

As shown in FIG. 7, the spacer members 67 are disposed at places where the light emitting elements 56 are not arranged in the first surface 55*a* of the substrate 55. Although the three spacer members 67 are disposed in the example shown in FIG. 7, the number of the spacer members 67 is not particularly limited. The spacer members 67 each have contact with each of the first surface 55*a* of the substrate 55 and the first side surface 50*c* of the wavelength conversion member 50 to hold the light emitting elements 56 and the wavelength conversion member 50 at respective positions separated from each other. The height (a distance between the substrate 55 and the wavelength conversion member 50) of the spacer members 67 is in a range of, for example, about 0.2 mm through 2 mm. It is desirable for the spacer members 67 to be formed of a material excellent in light resistance such as metal or glass. Alternatively, the spacer members 67 can be formed directly on the first surface 55*a* of the substrate 55 using a method such as screen printing. Further, the spacer members 67 and the wavelength conversion member 50 can have direct contact with each other, or can also have indirect contact with each other via a member therebetween. When a member is arranged therebetween, it is more preferable for the member to be a non-adherent member.

The spacer members 67 can be disposed at places in the substrate 55 where the light emitting elements 56 are arranged. It should be noted that in the case of the present embodiment, since the spacer members 67 are arranged at the places in the substrate 55 where the light emitting elements 56 are not arranged, there is no chance for the excitation light E emitted from the light emitting elements 56 to be blocked by the spacer member 67, and thus, it is possible to enhance the use efficiency of the excitation light E.

As shown in FIG. 5, the second heatsink 68 is disposed so as to have contact with the second surface 55*b* of the substrate 55. The second heatsink 68 has a flat plate 71 and a plurality of fins 72. The flat plate 71 has contact with the second surface 55*b* of the substrate 55 throughout the entire surface. The plurality of fins 72 is disposed on the flat plate 71 at intervals in the long axis direction (the X-axis direction) of the wavelength conversion member 50. The number of the fins 72 is not particularly limited. The second heatsink 68 is formed of metal such as stainless steel or aluminum.

The heat of the substrate 55 is transferred to the second heatsink 68 by the second heatsink 68 making contact with the substrate 55, and the second heatsink 68 releases the heat to the external space from the fins 72. Therefore, as shown in FIG. 3, it is desirable for each of the fins 72 to be arranged in parallel to a flow direction B of air from a fan of the projector 1 so that the plurality of fins 72 efficiently get the air fed from the fan of the projector 1. Thus, it is possible to enhance the cooling efficiency of the second heatsink 68. Further, since the arrangement direction of the plurality of fins 72 coincides with the long axis direction of the wavelength conversion member 50, it is possible to homogenously cool the wavelength conversion member 50 throughout the length in the long axis direction.

As shown in FIG. 4, the flat plate 71 of the second heatsink 68 is provided with holes 71*h* to be fixed to the substrate 55. A fixation structure between the second heatsink 68 and the substrate 55 will be described later. The second heatsink 68 in the present embodiment corresponds to a second heat radiation member in the appended claims.

The support member 54 and the fixation members 65 will hereinafter be described in detail.

As shown in FIG. 4, the support member 54 has a third surface 54*c* having contact with the first surface 55*a* of the substrate 55, and a fourth surface 54*d* located at an opposite side to the third surface 54*c*. Further, the support member 54 has a recess 54*f* which is recessed from the third surface 54*c* toward the fourth surface 54*d*. The recess 54*f* is formed to have a groove-like shape, and extends along the long axis direction (the X-axis direction) of the wavelength conversion member 50. The wavelength conversion member 50 is arranged inside the recess 54*f*. In a cross-sectional view crossing the long axis direction of the wavelength conversion member 50, the width W1 in the Z-axis direction of the support member 54 is smaller than the width W2 in the Z-axis direction of the substrate 55. The first surface 55*a* of the substrate 55 and the third surface 54*c* can have direct contact with each other, or can also have indirect contact with each other via an intervening member. As the intervening member, there can be cited, for example, a grease, and a bonding material is excluded.

The recess 54*f* has a bottom surface 54*j* having contact with the wavelength conversion member 50, and a first wall surface 54*m* and a second wall surface 54*n* extending in a direction crossing the bottom surface 54*j*, wherein the first wall surface 54*m* is opposed to the third side surface 50*e* of the wavelength conversion member 50, and the second wall surface 54*n* is opposed to the fourth side surface 50*f* thereof. The first wall surface 54*m* and the second wall surface 54*n* are each separated from the wavelength conversion member 50, and are each formed of a tilted surface tilted in a direction along which a distance from the wavelength conversion member 50 increases in a direction from the bottom surface 54*j* toward the third surface 54*c*. In other words, the recess 54*f* has a groove-like shape the width of which increases in a direction from the bottom surface 54*j* toward the third surface 54*c*. It should be noted that each of the first wall surface 54*m* and the second wall surface 54*n* is not necessarily required to be entirely formed of the tilted surface, and can partially be formed of the tilted surface. Further, each of the first wall surface 54*m* and the second wall surface 54*n* can be formed of a curved surface. Further, at least one of the first wall surface 54*m* and the second wall surface 54*n* can have contact with the wavelength conversion member 50.

Each of the first wall surface 54*m* and the second wall surface 54*n* is formed of a surface of metal such as aluminum or stainless steel as the constituent material of the support member 54. More specifically, each of the first wall surface 54*m* and the second wall surface 54*n* is formed of a processed surface obtained by performing mirror finish on the metal surface described above. Therefore, each of the first wall surface 54*m* and the second wall surface 54*n* has light reflectivity, and reflects the excitation light E having entered the first wall surface 54*m* or the second wall surface 54*n*. It should be noted that each of the first wall surface 54*m* and the second wall surface 54*n* can be formed of other metal films or other dielectric multilayer films formed on the surface of the metal such as aluminum or stainless steel.

In the cross-sectional view crossing the long axis direction of the wavelength conversion member 50, the width W3 in the Z-axis direction of the light emitting elements 56 is larger than the width W4 in the Z-axis direction of the wavelength conversion member 50. Thus, in the Z-axis direction, both end portions of each of the light emitting elements 56 protrude outside the wavelength conversion member 50. Specifically, the both end portions of each of the light emitting elements 56 protrude up to positions overlapping a gap between the third side surface 50*e* and the first wall surface 54*m*, and a gap between the fourth side surface 50*f* and the second wall surface 54*n*.

According to this configuration, a part of the excitation light E emitted from the light emitting element 56 proceeds through the gap between the third side surface 50*e* and the first wall surface 54*m*, or the gap between the fourth side surface 50*f* and the second wall surface 54*n*, and then enters the first wall surface 54*m* or the second wall surface 54*n* thus tilted. On this occasion, the excitation light E is reflected by the first wall surface 54*m* or the second wall surface 54*n* to enter the third side surface 50*e* or the fourth side surface 50*f* of the wavelength conversion member 50. As described above, since the first wall surface 54*m* and the second wall surface 54*n* are tilted, it becomes easy for the excitation light E passing through the gap between the wavelength conversion member 50 and the support member 54 to enter the third side surface 50*e* or the fourth side surface 50*f*. Therefore, it is possible to reduce an amount of the excitation light E which is reflected by the bottom surface 54*j* and then returns toward the light source unit 51. Thus, the use efficiency of the excitation light E can be increased. On this occasion, the excitation light E partially enters the support member 54, and is partially absorbed by the support member 54, and thus, the temperature of the support member 54 itself rises. Also in this sense, the heat radiation of the support member 54 is important.

At positions of the substrate 55 corresponding to the holes 71*h* of the second heatsink 68, there are respectively disposed first through holes 55*h* penetrating the substrate 55 in a direction crossing the first surface 55*a* and the second surface 55*b*.

The fixation members 65 are each formed of a plate-like member having contact with outer surfaces of the support member 54 except the third surface 54*c*. The fixation members 65 are each constituted by an elastic member made of metal such as a hard steel material or stainless steel high in elastically restorative force, and each have a shape bent at a substantially right angle at four places. Therefore, the fixation members 65 is capable of making an elastic deformation and an elastic restoration when receiving external force. It should be noted that the fixation members 65 can each be a plate material made of metal such as copper, resin, or glass providing the material is capable of making the elastic deformation and the elastic restoration.

The fixation members 65 each have a pressing part 74 and an attachment part 75. The pressing part 74 surrounds the outer surfaces of the support member 54 except the third surface 54*c*, and has contact with the outer surfaces. Spring functional parts 76 curved outward are disposed in respective portions opposed to the both side surfaces of the support member 54 out of the pressing part 74. By the spring functional parts 76 being disposed in these places, it becomes possible for the pressing part 74 to expand/contract in the height direction (the Y-axis direction) of the support member 54. The attachment part 75 extends along the first surface 55*a* of the substrate 55 from the both ends of the pressing part 74, and has contact with the first surface 55*a*. In the attachment part 75, at positions corresponding respectively to the holes 71*h* of the second heatsink 68, there are disposed second through holes 65*h* penetrating the attachment part 75 in the thickness direction.

As shown in FIG. 6, grooves 54*p* are disposed at positions where the fixation members 65 have contact with the support member 54 on the fourth surface 54*d* of the support member 54. In the long axis direction (the X-axis direction) of the wavelength conversion member 50, the width L2 of the groove 54*p* is larger than the width L1 of the fixation member 65. Thus, the fixation member 65 is arranged inside the groove 54*p*. Further, the depth D1 of the groove 54*p* is larger than the thickness T1 of the fixation member 65. It is desirable for the width L1 of the fixation member 65 to be in a range of, for example, about 2 mm through 10 mm. It is desirable for the thickness T1 of the fixation member 65 to be in a range of, for example, about 0.1 mm through 2 mm. According to this configuration, the alignment of the fixation member 65 to the support member 54 is easy, and the possibility that the position of the fixation member 65 is displaced in the X-axis direction is low. Further, since the fixation member 65 does not protrude downward from the fourth surface 54*d* of the support member 54, it is difficult for other components and the light source device 100 to interfere with each other, and it becomes easy to handle the light source device 100.

As shown in FIG. 4, the fixation members 65, the substrate 55, and the second heatsink 68 are fixed to each other with screw members 78 which are inserted into the second through holes 65*h* of the fixation members 65, the first through holes 55*h* of the substrate 55, and the holes 71*h* of the second heatsink 68. According to this configuration, since the fixation member 65, the substrate 55, and the second heatsink 68 are fixed in a lump with the single screw member 78, it is possible to simplify the fixation structure between the members. Further, it is difficult to provide a through hole to, for example, the second heatsink 68 in order to fix the substrate 55 and the second heatsink 68 to each other and insert a screw member from a surface at the side provided with the fins 72 toward the substrate 55, but when the configuration described above is adopted, it is possible to easily insert the screw members 78. Therefore, it is possible to easily perform the assembling work of the light source device 100, and at the same time, it is possible to ensure the area of the fins 72 of the second heatsink 68, and the degree of freedom of the arrangement of the fins 72.

It should be noted that when the advantage described above is not required, it is possible to adopt a configuration in which, for example, the fixation member 65 and the substrate 55 are fixed to each other with a single screw member, and the substrate 55 and the second heatsink 68 are fixed to each other with another screw member. In that case, the fixation between the fixation member 65 and the substrate 55, and the fixation between the substrate 55 and the second heatsink 68 can be achieved using a method other than screwing.

An action with which the support member 54 is pressed against the substrate 55 will hereinafter be described.

Figure 8A:
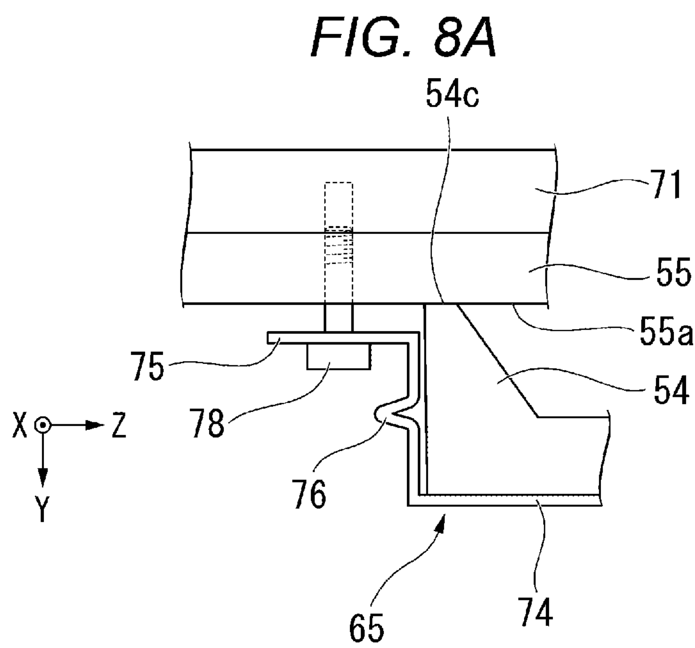
FIG. 8A is a diagram showing a state of a fixation member before tightening a screw member.
Figures 8B, 9:
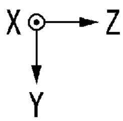
FIG. 8B is a diagram showing the state of the fixation member after tightening the screw member.
FIG. 9 is a front view of a light source device according to a second embodiment.

FIG. 8A is a diagram showing a state of the fixation member 65 before tightening the screw member 78. FIG. 8B is a diagram showing a state of the fixation member 65 after tightening the screw member 78.

In the stage shown in FIG. 8A in which the screw member 78 has not been tightened, the third surface 54*c* of the support member 54 has contact with the first surface 55*a* of the substrate 55, but the attachment part 75 of the fixation member 65 does not have contact with the first surface 55*a* of the substrate 55. This state corresponds to an initial state of the fixation member 65 in which no external force is applied to the fixation member 65. On this occasion, the spring functional part 76 of the fixation member 65 is in a state of being strongly bent.

Then, as shown in FIG. 8B, the screw member 78 is tightened until the attachment part 75 of the fixation member 65 makes contact with the first surface 55*a* of the substrate 55. Then, the spring functional part 76 of the fixation member 65 is stretched in the thickness direction (the Y-axis direction) of the support member 54 to thereby change from the strongly bent state to a stretched state. On this occasion, since the fixation member 65 has elasticity, the elastically restorative force of restoring to the initial state acts, and the pressing part 74 of the fixation member 65 presses the support member 54 toward the first surface 55*a* of the substrate 55.

Due to the action described above, the fixation member 65 presses the support member 54 toward the substrate 55 in the state in which the spring functional part 76 is stretched to thereby fix the support member 54 to the substrate 55. The fixation member 65 is formed of the plate-like member having a predetermined width, and is therefore capable of stably fix the support member 54 in the long axis direction (the X-axis direction) of the wavelength conversion member 50. Further, since the spacer member 67 intervenes between the substrate 55 and the wavelength conversion member 50, when the support member 54 is pressed toward the substrate 55, there occurs the force of making the spacer member 67 press the wavelength conversion member 50 toward the bottom surface 54*j* of the recess 54*f* of the support member 54. Thus, the wavelength conversion member 50 is fixed in the state of adhering to the support member 54 without the intervention of the bonding material.

As shown in FIG. 2, the collimating optical system 63 formed of a collimator lens and so on is disposed between the light source device 100 and the integrator optical system 70. The fluorescence Y emitted from the angle conversion member 52 enters the collimating optical system 63, the collimating optical system 63 makes the angle distribution of the fluorescence Y smaller, and then makes the fluorescence Y high in parallelism enter the integrator optical system 70. It should be noted that the collimating optical system 63 is not required to be disposed when the parallelism of the fluorescence Y emitted from the angle conversion member 52 is sufficiently high.

The integrator optical system 70 has a first lens array 61 and a second lens array 101. The integrator optical system 70 functions as a homogenous illumination optical system for homogenizing an intensity distribution of the fluorescence Y emitted from the light source device 100 in each of the light modulation devices 4R, 4G as the illumination target areas in cooperation with the superimposing optical system 103. The fluorescence Y emitted from the collimating optical system 63 enters the first lens array 61. The first lens array 61 constitutes the integrator optical system 70 together with a second lens array 101.

The first lens array 61 has a plurality of first small lenses 61*a*. The plurality of first small lenses 61*a* is arranged in a matrix in a plane parallel to the Y-Z plane perpendicular to the optical axis AX1 of the first illumination device 20. The plurality of first small lenses 61*a* divides the fluorescence Y emitted from the angle conversion member 52 into a plurality of partial light beams. A shape of each of the first small lenses 61*a* is a rectangular shape substantially similar to a shape of each of the image formation areas of the light modulation devices 4R, 4G. Thus, each of partial light beams emitted from the first lens array 61 efficiently enters each of the image formation areas of the light modulation devices 4R, 4G.

The fluorescence Y emitted from the first lens array 61 proceeds toward the second lens array 101. The second lens array 101 is arranged so as to be opposed to the first lens array 61. The second lens array 101 has a plurality of second small lenses 101*a* corresponding to the plurality of first small lenses 61*a* of the first lens array 61. The second lens array 101 forms each of images of the plurality of first small lenses 61*a* of the first lens array 61 in the vicinity of each of the image formation areas of the light modulation devices 4R, 4G in cooperation with the superimposing optical system 103. The plurality of second small lenses 101*a* is arranged in a matrix in a plane parallel to the Y-Z plane perpendicular to the optical axis AX1 of the first illumination device 20.

Each of the first small lenses 61*a* of the first lens array 61 and each of the second small lenses 101*a* of the second lens array 101 have respective sizes the same as each other in the present embodiment, but can have respective sizes different from each other. Further, the first small lenses 61*a* of the first lens array 61 and the second small lenses 101*a* of the second lens array 101 are arranged at positions where respective optical axes coincide with each other in the present embodiment, but can be arranged in a state in which the axes are shifted from each other.

The polarization conversion element 102 converts the polarization direction of the fluorescence Y emitted from the second lens array 101. Specifically, the polarization conversion element 102 converts each of the partial light beams of the fluorescence Y which are divided by the first lens array 61, and which are emitted from the second lens array 101, into linearly polarized light.

The polarization conversion element 102 has a polarization splitting layer (not shown) for transmitting one of the linearly polarized components included in the fluorescence Y emitted from the light source device 100 without modification while reflecting the other of the linearly polarized components toward a direction perpendicular to the optical axis AX1, a reflecting layer (not shown) for reflecting the other of the linearly polarized components reflected by the polarization splitting layer, toward a direction parallel to the optical axis AX1, and a wave plate (not shown) for converting the other of the linearly polarized components reflected by the reflecting layer into the one of the linearly polarized components.

Advantages of First Embodiment

The light source device 100 according to the present embodiment is provided with the light emitting elements 56 configured to emit the excitation light E, the substrate 55 having the first surface 55*a* on which the light emitting elements 56 are arranged, and the second surface 55*b* located at the opposite side to the first surface 55*a*, the wavelength conversion member 50 which includes the phosphor, and which converts the excitation light E emitted from the light emitting elements 56 into the fluorescence Y, the support member 54 which has the third surface 54*c* having contact with the first surface 55*a* of the substrate 55, and the fourth surface 54*d* located at the opposite side to the third surface 54*c*, and which supports the wavelength conversion member 50, the fixation members 65 configured to fix the support member 54 to the substrate 55, and the spacer members 67 which have contact with each of the substrate 55 and the wavelength conversion member 50, and which hold the light emitting elements 56 and the wavelength conversion member 50 at the respective positions separated from each other. The fixation members 65 fix the support member 54 to the substrate 55 in the state of pressing the third surface 54*c* toward the first surface 55*a*.

According to the configuration of the present embodiment, by appropriately selecting the parameters such as the constituent material and the thickness of the fixation members 65, and the shape and the dimensions of the spring functional parts 76, it is possible to appropriately adjust the force of making the fixation members 65 press the support member 54 toward the substrate 55. On this occasion, as described above, the force of pressing the wavelength conversion member 50 toward the support member 54 is also appropriately adjusted due to the action of the spacer member 67, and thus, it is possible to improve the adhesiveness between the wavelength conversion member 50 and the support member 54. Thus, the heat generated in the wavelength conversion member 50 is sufficiently transferred to the support member 54, then is transferred to the second heatsink 68 via the substrate 55 having contact with the support member 54, and is then released to the external space from the second heatsink 68. As a result, a decrease in wavelength conversion efficiency due to a rise in temperature of the wavelength conversion member 50 can be suppressed, and thus, it is possible to obtain the fluorescence Y having an intended intensity.

Further, even when the dimension error supposedly exists when manufacturing the wavelength conversion member 50 and the spacer member 67, the dimension error is absorbed by a deformation amount of the spring functional parts 76 of the fixation members 65, and therefore, the pressing force is appropriately adjusted at any time. As a result, the advantages described above are stably exerted, and at the same time, the damage of the wavelength conversion member 50 can be prevented. As described above, according to the present embodiment, it is possible to realize the light source device 100 which is capable of obtaining the fluorescence Y having the intended intensity, and which is excellent in reliability.

In the case of the present embodiment, since the heat of the support member 54 is released to the external space from the second heatsink 68 via the substrate 55, it is not necessarily required to dispose a heatsink on the fourth surface 54*d* of the support member 54. Thus, it is possible to achieve reduction in size of the light source device 100. It should be noted that when it is desired to release a larger amount of heat, it is possible to dispose a heatsink also on the fourth surface 54*d* of the support member 54.

Since the projector 1 according to the present embodiment is equipped with the light source device 100 according to the present embodiment, it is possible to realize a projector high in efficiency and small in size.

Second Embodiment

A second embodiment of the present disclosure will hereinafter be described using the drawings.

Basic configurations of a projector and a light source device according to the second embodiment are substantially the same as those in the first embodiment, and configurations of a support member and a fixation member are different from those in the first embodiment. Therefore, the description of the basic configurations of the projector and the light source device will be omitted.

FIG. 9 is a front view of the light source device 120 according to the second embodiment.

In FIG. 9, the constituents common to the drawing used in the first embodiment are denoted by the same reference symbols, and the description thereof will be omitted.

As shown in FIG. 9, the light source device 120 according to the present embodiment is provided with a wavelength conversion member 50, the light source unit 51, the angle conversion member (not shown), the mirror (not shown), a support member 44, fixation members 45, the spacer members 67, and the second heatsink 68.

The support member 44 has a third surface 44*c* having contact with the first surface 55*a* of the substrate 55, and a fourth surface 44*d* located at an opposite side to the third surface 44*c*. Further, the support member 44 has a main body 46 provided with a recess 44*f* for supporting the wavelength conversion member 50, and an attachment part 47. The main body 46 and the attachment part 47 are formed of an integrated member. The attachment part 47 extends along the third surface 44*c* of the support member 44, and has a thickness thinner than the thickness of the main body 46. The recess 44*f* has a bottom surface 44*j* for supporting the wavelength conversion member 50, and a first wall surface 44*m* and a second wall surface 44*n* tilted with respect to the bottom surface 44*j*.

The substrate 55 is provided with the first through holes 55*h* penetrating in a direction crossing the first surface 55*a* and the second surface 55*b*. The attachment part 47 of the support member 44 is provided with second through holes 44*h* penetrating the attachment part 47 in a direction crossing the third surface 44*c* disposed at positions corresponding to the first through holes 55*h* of the substrate 55. At the positions in the second heatsink 68 corresponding to the first through holes 55*h* and the second through holes 44*h*, there are disposed the holes 71*h*. In the case of the present embodiment, since the second through holes 44*h* are provided to the attachment part 47 having the thickness thinner than the thickness of the main body 46, it is easy to process the second through holes 44*h*.

The fixation members 45 are each provided with a screw member 48 and an elastic member 49. The screw member 48 has a head 48*a*, and is inserted in the second through hole 44*h*, the first through hole 55*h*, and the hole 71*h*. The elastic member 49 is a ring-like member through which the screw member 48 penetrates, and intervenes between the head 48*a* of the screw member 48 and the attachment part 47 of the support member 44. As the elastic member 49, there is used, for example, a spring washer, a coil spring, or a ring-like rubber.

The support member 44, the substrate 55, and the second heatsink 68 are fixed to each other with the screw members 48 inserted in the second through holes 44*h*, the first through holes 55*h*, and the holes 71*h*. According to this configuration, since the support member 44, the substrate 55, and the second heatsink 68 are fixed in a lump with the single screw member 48, it is possible to simplify the fixation structure between the members. Further, similarly to the first embodiment, there is no need to insert the screw member for the fixation from a surface at the side at which the fins 72 of the second heatsink 68 are disposed. Thus, it is possible to achieve the simplification of the assembling work of the light source device 120 and securement of the radiation performance of the second heatsink 68. The rest of the configuration of the light source device 120 is substantially the same as that of the light source device 100 according to the first embodiment.

An action with which the support member 44 is pressed against the substrate 55 will hereinafter be described.

Figure 10A:
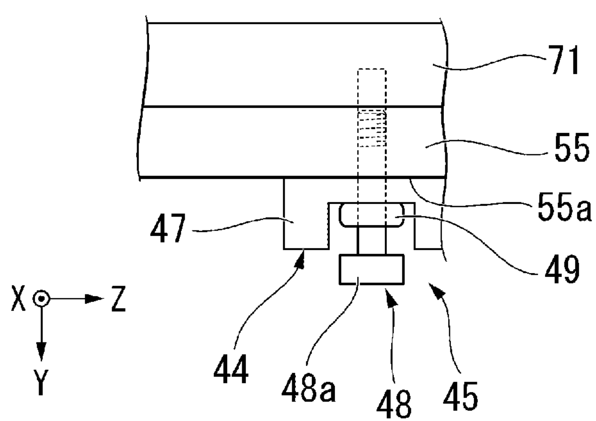
FIG. 10A is a diagram showing the state of a fixation member before tightening a screw member.
Figure 10B:
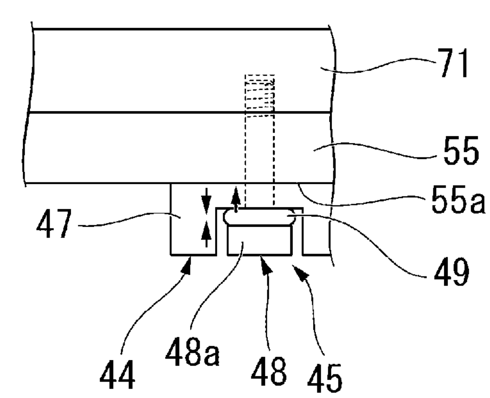
FIG. 10B is a diagram showing the state of the fixation member after tightening the screw member.
Figure 10B:
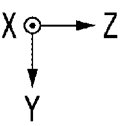

FIG. 10A is a diagram showing a state of the fixation member 45 before tightening the screw member 48. FIG. 10B is a diagram showing a state of the fixation member 45 after tightening the screw member 48.

In the stage shown in FIG. 10A in which the screw member 48 has not been tightened, the head 48*a* of the screw member 48 does not have contact with the elastic member 49. This state corresponds to an initial state of the elastic member 49 in which no external force is applied to the elastic member 49. Then, as shown in FIG. 10B, when tightening the screw member 48, the state of the elastic member 49 changes to the state of being compressed in the thickness direction (the Y-axis direction) of the elastic member 49. On this occasion, due to the elastically restorative force of restoring to the initial state, the elastic member 49 presses the support member 44 toward the first surface 55*a* of the substrate 55.

Due to the action described above, the fixation member 45 presses the support member 44 toward the substrate 55 in the state in which the elastic member 49 is compressed to thereby fix the support member 44 to the substrate 55. Further, since the spacer member 67 intervenes between the substrate 55 and the wavelength conversion member 50, when the support member 44 is pressed toward the substrate 55, there occurs the force of making the spacer member 67 press the wavelength conversion member 50 toward the bottom surface 44*j* of the recess 44*f* of the support member 44. Therefore, the wavelength conversion member 50 is fixed in the state of adhering to the support member 44 without the intervention of the bonding material.

Advantages of Second Embodiment

Also in the present embodiment, since the wavelength conversion member 50 is pressed against the support member 44 with appropriate force, and the support member 44 is pressed against the substrate 55 with appropriate force even when the dimension error of the wavelength conversion member 50 or the spacer member 67 exists, it is possible to obtain substantially the same advantages as those of the first embodiment such as the advantage that the decrease in wavelength conversion efficiency due to the rise in temperature of the wavelength conversion member 50 is suppressed, and thus, the fluorescence Y having the intended intensity can be obtained, and the advantage that the damage of the wavelength conversion member 50 can be prevented. Thus, it is possible to realize the light source device 120 which is capable of obtaining the fluorescence Y having the intended intensity, and which is excellent in reliability.

First Modified Example

A modified example of the present embodiment will hereinafter be described.

Figure 11:
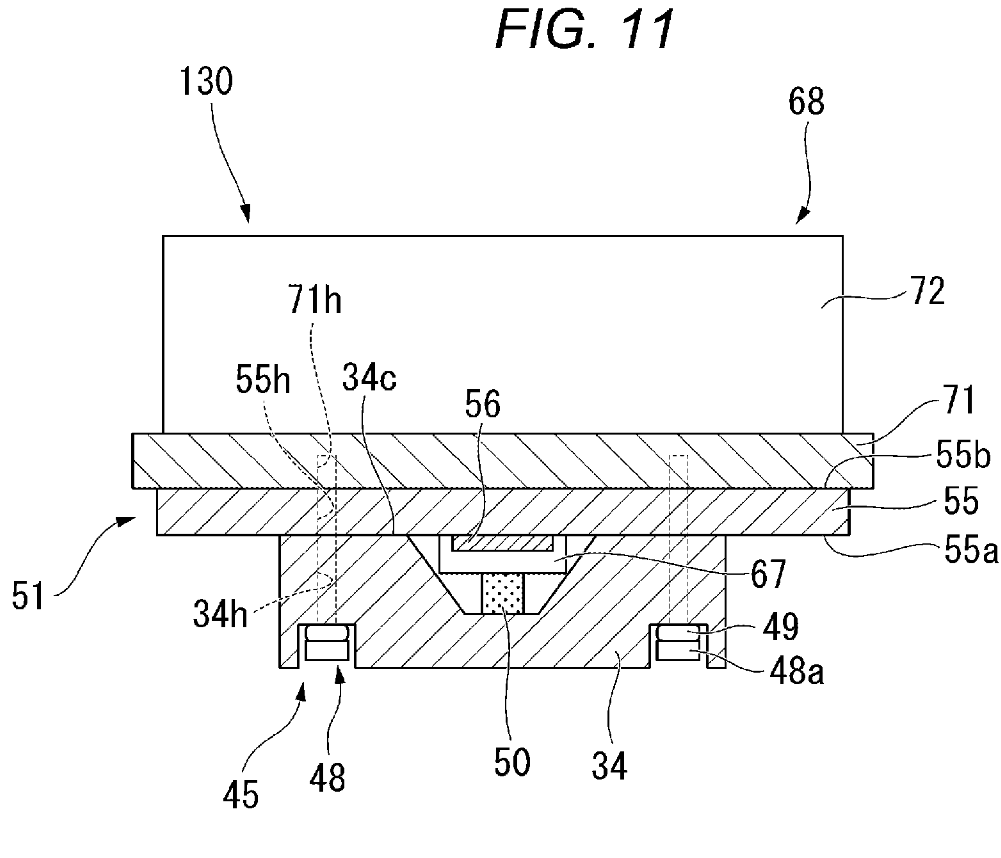
FIG. 11 is a front view of a light source device according to a first modified example.

FIG. 11 is a front view of a light source device 130 according to a first modified example. In FIG. 11, the constituents common to the light source device 120 according to the second embodiment described above are denoted by the same reference symbols, and the detailed description thereof will be omitted.

As shown in FIG. 11, the support member 34 in the first modified example does not have the attachment part extending from the main body along the third surface of the support member unlike the support member 44 in the second embodiment. The main body of the support member 34 is provided with second through holes 34*h* penetrating the support member 34 in a direction crossing the third surface 34*c*. The rest of the configuration of the light source device 130 is substantially the same as that of the light source device 120 according to the second embodiment.

Also in the present modified example, it is possible to obtain substantially the same advantage as that of the second embodiment described above such as the advantage that it is possible to realize the light source device 130 which can obtain the fluorescence Y having the intended intensity, and which is excellent in reliability.

In the case of the present modified example, since the support member 34 does not have the attachment part, it is possible to reduce the width in the Z-axis direction of the support member 34 compared to the second embodiment. Further, since the second through holes 34*h* are provided to the support member 34 having the sufficient thickness, it is possible for the support member 34 to stably receive the pressing force from the elastic member 49.

Third Embodiment

A third embodiment of the present disclosure will hereinafter be described using the drawings.

Basic configurations of a projector and a light source device according to the third embodiment are substantially the same as those in the first embodiment, and therefore, the description of the basic configurations of the projector and the light source device will be omitted.

Figure 12:
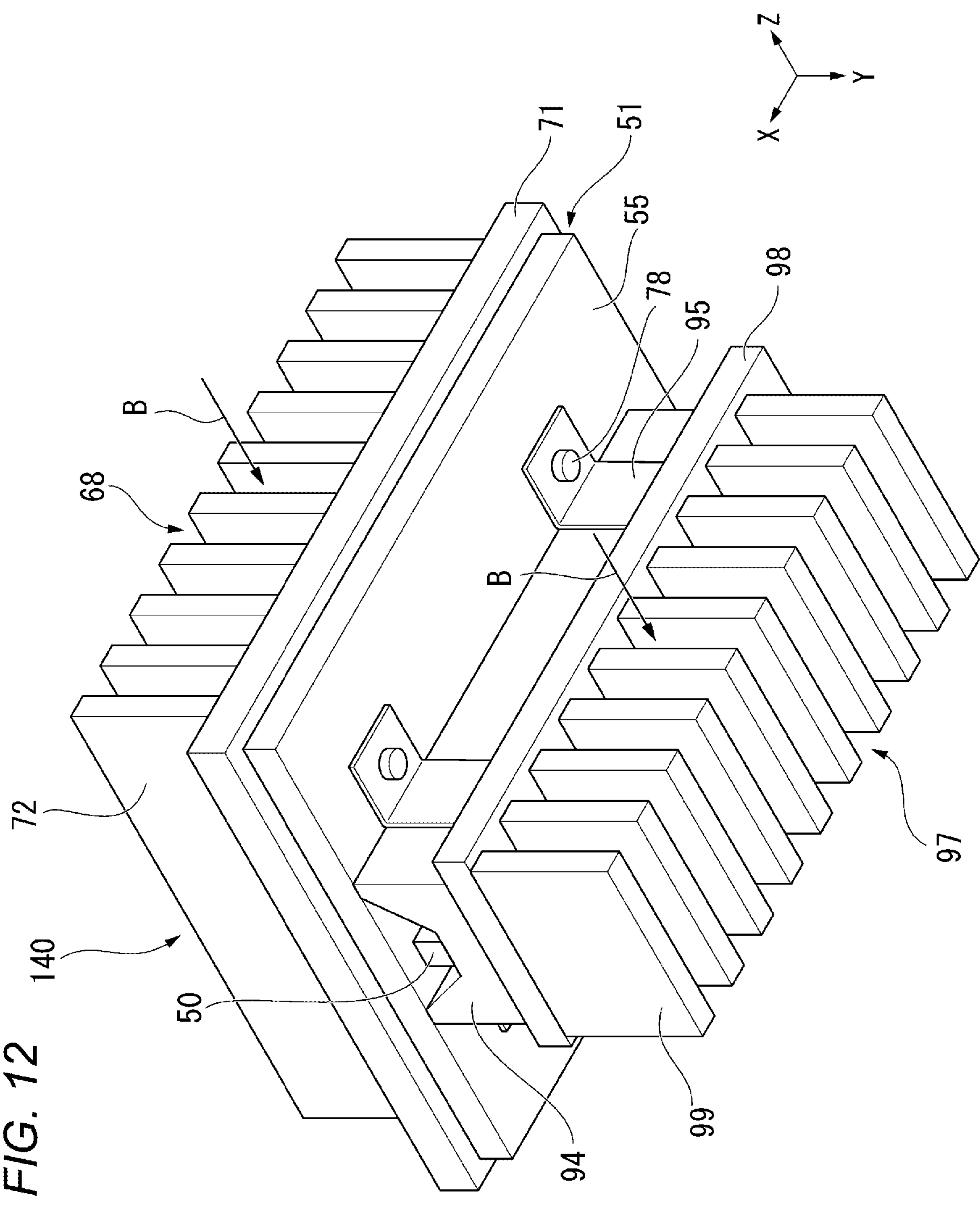
FIG. 12 is a perspective view of a light source device according to a third embodiment.
Figure 13:
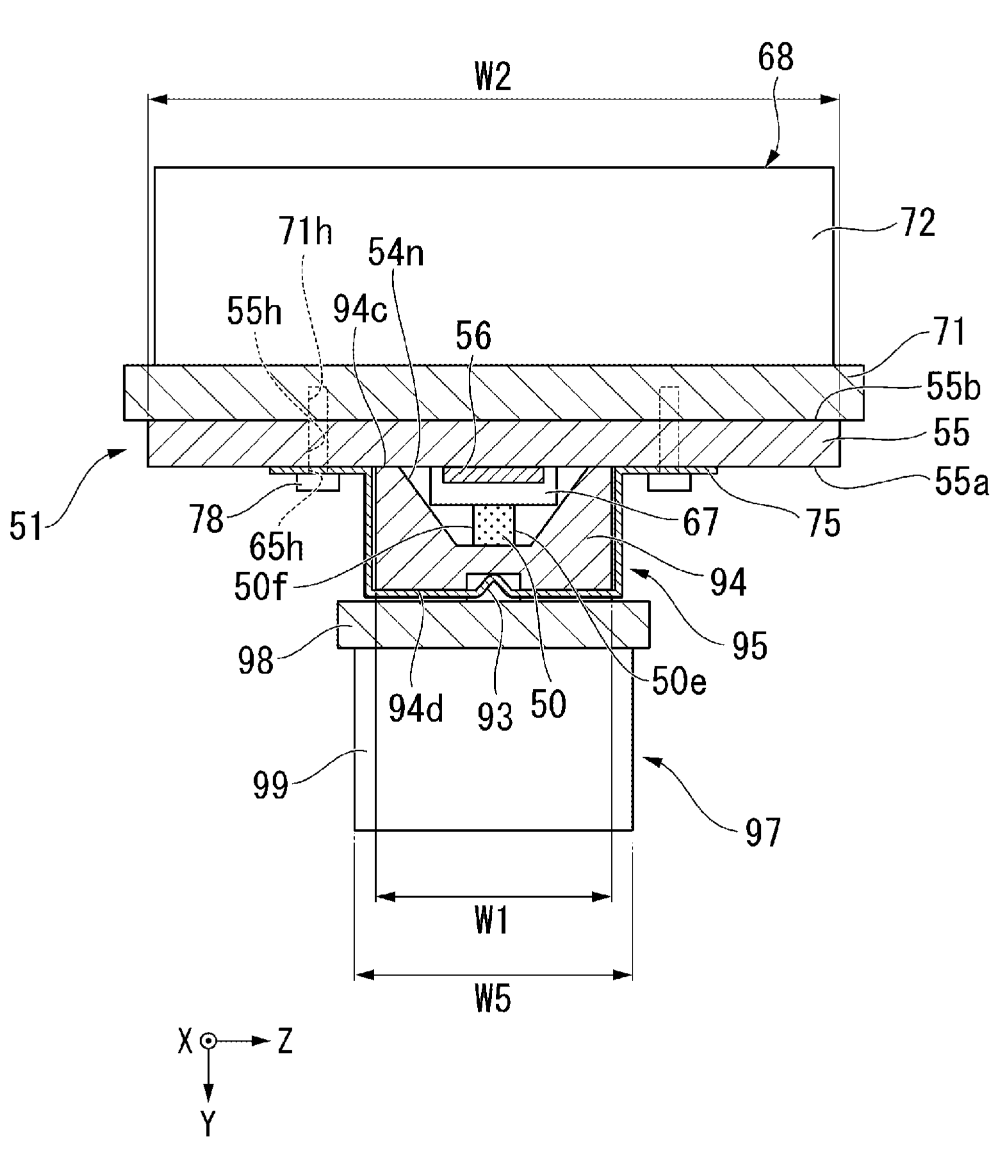
FIG. 13 is a front view of the light source device.

FIG. 12 is a perspective view of the light source device 140 according to the third embodiment. FIG. 13 is a front view of the light source device 140 according to the third embodiment.

In FIG. 12 and FIG. 13, the constituents common to the drawings used in the first embodiment are denoted by the same reference symbols, and the description thereof will be omitted.

As shown in FIG. 12 and FIG. 13, the light source device 140 according to the present embodiment is provided with the wavelength conversion member 50, the light source unit 51, the angle conversion member (not shown), the mirror (not shown), a support member 94, fixation members 95, the spacer members 67, a first heatsink 97, and the second heatsink 68.

The first heatsink 97 is disposed so as to be opposed to a fourth surface 94*d* of the support member 94. Although not shown in the drawings, also in the present embodiment, a groove is disposed on the fourth surface 94*d* of the support member 94, and the fixation members 95 are arranged inside the groove as shown in FIG. 6 in the first embodiment. Therefore, even when the fixation members 95 are arranged on the fourth surface 94*d* of the support member 94, the fixation members 95 do not protrude from the fourth surface 94*d*, and the first heatsink 97 has close contact with the fourth surface 94*d* of the support member 94. The first heatsink 97 in the present embodiment corresponds to a first heat radiation member in the appended claims.

The first heatsink 97 has a flat plate 98 and a plurality of fins 99 similarly to the second heatsink 68. A fixation structure between the first heatsink 97 and the support member 94 is not particularly limited, and it is possible to adopt a configuration in which, for example, the support member 94 is provided with an attachment part, and is screwed to the first heatsink 97 in the attachment part, or a configuration in which the first heatsink 97 is provided with an attachment part, and is screwed to the support member 94 in the attachment part.

The fixation members 95 are substantially the same as the fixation members 65 in the first embodiment, but are different from the fixation members 65 in the first embodiment in the point that a spring functional part 93 is disposed at a position opposed to the fourth surface 94*d* of the support member 94. Also in the present embodiment, similarly to the first embodiment, the fixation members 95 each press the support member 94 against the substrate 55 with the elastically restorative force in the state in which the spring functional part 93 is stretched to thereby fix the support member 94.

As shown in FIG. 13, in the cross-sectional view crossing the long axis direction (the X-axis direction) of the wavelength conversion member 50, the width W1 in the Z-axis direction of the support member 94 is smaller than the width W2 in the Z-axis direction of the substrate 55. Further, the width W5 in the Z-axis direction of the first heatsink 97 is smaller than the width W2 in the Z-axis direction of the substrate 55. The width W2 of the substrate 55 is in a range of, for example, about 50 mm through 70 mm. The width W1 of the support member 94 is in a range of, for example, about 5 mm through 20 mm. The width W1 of the support member 94 is preferably no larger than ⅓ of the width W2 of the substrate 55, more preferably no larger than ⅕ of the width W2 of the substrate 55, and further more preferably no larger than 1/10 of the width W2 of the substrate 55.

The rest of the configuration of the light source device 140 is substantially the same as in the first embodiment.

Advantages of Third Embodiment

Also in the present embodiment, since the wavelength conversion member 50 is pressed against the support member 94 with appropriate force, and the support member 94 is pressed against the substrate 55 with appropriate force even when the dimension error of the wavelength conversion member 50 or the spacer member 67 exists, it is possible to obtain substantially the same advantages as those of the first embodiment such as the advantage that the decrease in wavelength conversion efficiency due to the rise in temperature of the wavelength conversion member 50 is suppressed, and thus, the fluorescence Y having the intended intensity can be obtained, and the advantage that the damage of the wavelength conversion member 50 can be prevented. Thus, it is possible to realize the light source device 140 which is capable of obtaining the fluorescence Y having the intended intensity, and which is excellent in reliability.

The light source device 140 according to the present embodiment is provided with the first heatsink 97 in addition to the second heatsink 68, and is therefore capable of efficiently release the heat of the support member 94 to the external space. Further, although the width W1 of the support member 94 can be the same as the width W2 of the substrate 55, since a limited part of the heat of the wavelength conversion member 50 is only transferred to end portions of the support member 94 far from the wavelength conversion member 50, areas in the end portions of the support member 94 are wasted places from a viewpoint of heat transfer. Therefore, the configuration of making the width W1 of the support member 94 smaller than the width W2 of the substrate 55 as in the present embodiment is reasonable.

Further, since the heat of the support member 94 is released from both of the second heatsink 68 and the first heatsink 97, it is reasonable to adopt a configuration in which the width W5 of the first heatsink 97 disposed on the fourth surface 94*d* of the support member 94 is also made smaller than the width W2 of the substrate 55 similarly to the width W1 of the support member 94 without making the width W5 wastefully large. As described above, according to the present embodiment, it is possible to more surely prevent the rise in temperature of the wavelength conversion member 50, and at the same time, it is possible to achieve the reduction in size of a portion at the support member 94 side of the light source device 140.

It should be noted that the scope of the present disclosure is not limited to the embodiments described above, and a variety of modifications can be provided thereto within the scope or the spirit of the present disclosure. Further, one aspect of the present disclosure can be provided with a configuration obtained by arbitrarily combining characterizing portions of the embodiments and the modified examples described above with each other.

Although in the light source devices according to the first embodiment and the third embodiment, the whole of the fixation members is formed of the elastic material, it is possible to adopt a configuration in which, for example, the spring functional part of the fixation member is formed of the elastic material, and other portions than the spring functional part do not have elasticity. Further, the fixation members are not necessarily required to be formed of the plate-like members, and can be formed of a wire member such as a piano wire.

In the embodiments described above, there is cited the heatsink as an example of the heat radiation member, it is possible to use a cooling device such as a Peltier element, a heat transfer member such as a heat pipe, an arbitrary liquid cooling device for housing a cooling medium consisting of a liquid in a container, and so on besides the heatsink. Alternatively, it is possible to directly form fins on an outer surface of the support member. According to this configuration, there is no need to fix the heatsink to the support member. Further, although in the embodiments described above, there is described the example in which the heat radiation member is disposed on the fourth surface of the support member, it is possible to further dispose the heat radiation member on the side surface crossing the fourth surface of the support member.

Although in each of the embodiments described above, there is described the example in which the width of the support member is smaller than the width of the substrate in the cross-sectional view crossing the long axis direction (the X-axis direction) of the wavelength conversion member, regarding the second embodiment, since an attachment place for the plate-like member as the fixation member is unnecessary, the width of the support member is not necessarily required to be smaller than the width of the substrate.

Besides the above, the specific descriptions of the shape, the number, the arrangement, the material, and so on of the constituents of the light source device and the projector are not limited to those in the embodiments described above, and can arbitrarily be modified. Further, although in the embodiments described above, there is described the example of installing the light source device according to the present disclosure in the projector using the liquid crystal panels, the example is not a limitation. The light source device according to the present disclosure can also be applied to a projector using digital micromirror devices as the light modulation devices. Further, the projector is not required to have a plurality of light modulation devices, and can be provided with just one light modulation device.

Although in the embodiments described above, there is described the example of applying the light source device according to the present disclosure to the projector, the example is not a limitation. The light source device according to the present disclosure can also be applied to lighting equipment, a headlight of a vehicle, and so on.

Conclusion of Present Disclosure

Hereinafter, the conclusion of the present disclosure will supplementarily be noted.

Supplementary Note 1

A light source device including a light emitting element configured to emit first light having a first wavelength band, a substrate having a first surface on which the light emitting element is arranged, and a second surface located at an opposite side to the first surface, a wavelength conversion member which includes a phosphor, and which is configured to convert the first light emitted from the light emitting element into second light having a second wavelength band different from the first wavelength band, a support member having a third surface having contact with the first surface of the substrate, and a fourth surface located at an opposite side to the third surface, and configured to support the wavelength conversion member, a fixation member configured to fix the support member to the substrate, and a spacer member having contact with each of the substrate and the wavelength conversion member to hold the light emitting element and the wavelength conversion member at positions separated from each other, wherein the fixation member is configured including an elastic member, and is configured to fix the support member to the substrate in a state of pressing the third surface toward the first surface.

According to the configuration of Supplementary Note 1, even when the dimension error in the wavelength conversion member or the spacer member exists, the wavelength conversion member is pressed against the support member with the appropriate force, and the support member is pressed against the substrate with the appropriate force. As a result, there can be obtained the advantage that a decrease in wavelength conversion efficiency due to a rise in temperature of the wavelength conversion member can be suppressed, the advantage that it is possible to prevent the damage of the wavelength conversion member, and so on. Thus, it is possible to realize the light source device which is capable of obtaining the fluorescence having the intended intensity, and which is excellent in reliability.

Supplementary Note 2

The light source device described in Supplementary Note 1, wherein the fixation member is formed of a plate-like member having contact with at least a part of an outer surface except the third surface of the support member, and is configured to fix the support member to the substrate in a state in which the elastic member is stretched.

According to the configuration of Supplementary Note 2, it is possible for the fixation member to press the support member against the substrate using the elastically restorative force of the elastic member in the stretched state. Further, since the fixation member is formed of the plate-like member, it is possible to stably press the support member against the substrate.

Supplementary Note 3

The light source device described in Supplementary Note 2, wherein a groove is disposed at a position in the fourth surface where the plate-like member has contact with the support member, the plate-like member is arranged inside the groove, and a depth of the groove is larger than a thickness of the plate-like member.

According to the configuration of Supplementary Note 3, since the plate-like member does not protrude from the fourth surface of the support member, it is easy to handle the light source device. Further, when disposing the heat radiation member on the fourth surface of the support member, the heat radiation member tightly adheres to the fourth surface of the support member, and therefore, the heat transfer performance from the support member to the heat radiation member is improved.

Supplementary Note 4

The light source device described in Supplementary Note 3, further including a first heat radiation member which has contact with the fourth surface, and to which heat of the support member is transferred.

According to the configuration of Supplementary Note 4, the heat of the support member is transferred from the fourth surface to the first heat radiation member, and thus, the rise in temperature of the wavelength conversion member is suppressed. Thus, the deterioration of the wavelength conversion efficiency can be prevented.

Supplementary Note 5

The light source device described in any one of Supplementary Note 2 through Supplementary Note 4, further including a second heat radiation member which has contact with the second surface of the substrate, and to which heat of the substrate is transferred.

According to the configuration of Supplementary Note 5, the heat of the support member is transferred from the second surface of the substrate to the second heat radiation member, and thus, the rise in temperature of the wavelength conversion member is suppressed. Thus, the deterioration of the wavelength conversion efficiency can be prevented.

Supplementary Note 6

The light source device described in Supplementary Note 5, wherein the second heat radiation member is provided with a hole, a first through hole penetrating the substrate in a direction crossing the first surface and the second surface is disposed at a position of the substrate corresponding to the hole of the second heat radiation member, a second through hole penetrating the plate-like member in a thickness direction is disposed at a position of the plate-like member corresponding to the hole of the second heat radiation member, and the plate-like member, the substrate, and the second heat radiation member are fixed to each other with a screw member inserted in the second through hole, the first through hole, and the hole.

According to the configuration of Supplementary Note 6, since the plate-like member, the substrate, and the second heat radiation member are fixed in a lump with the screw member, it is possible to simplify the fixation structure of these members.

Supplementary Note 7

The light source device described in Supplementary Note 1, wherein the first surface of the substrate is provided with a hole, a through hole penetrating the support member in a direction crossing the third surface is disposed at a position of the support member corresponding to the hole of the substrate, the fixation member includes a screw member to be inserted in the through hole and the hole, and an elastic member intervening between a head of the screw member and the support member, and the fixation member fixes the support member to the substrate in a state in which the elastic member is compressed.

According to the configuration of Supplementary Note 7, it is possible for the fixation member to press the support member against the substrate using the elastically restorative force of the elastic member in the compressed state.

Supplementary Note 8

The light source device described in Supplementary Note 7, wherein the support member has a main body configured to support the wavelength conversion member, and an attachment part which extends along the third surface, and which is thinner in thickness than the main body, and the through hole is disposed in the attachment part.

According to the configuration of Supplementary Note 8, since the through hole is disposed in the attachment part thinner than the main body, it is possible to easily perform the processing of the through hole.

Supplementary Note 9

The light source device described in one of Supplementary Note 7 and Supplementary Note 8, further including a first heat radiation member which has contact with the fourth surface of the support member, and to which heat of the support member is transferred.

According to the configuration of Supplementary Note 9, the heat of the support member is transferred from the fourth surface to the first heat radiation member, and thus, the rise in temperature of the wavelength conversion member is suppressed. Thus, the deterioration of the wavelength conversion efficiency can be prevented.

Supplementary Note 10

The light source device described in any one of Supplementary Note 7 through Supplementary Note 9, further including a second heat radiation member which has contact with the second surface of the substrate, and to which heat of the substrate is transferred.

According to the configuration of Supplementary Note 10, the heat of the support member is transferred from the second surface of the substrate to the second heat radiation member, and thus, the rise in temperature of the wavelength conversion member is suppressed. Thus, the deterioration of the wavelength conversion efficiency can be prevented.

Supplementary Note 11

The light source device described in Supplementary Note 10, wherein the hole of the substrate is a first through hole penetrating the substrate in a direction crossing the first surface and the second surface, the through hole of the support member is a second through hole, a hole is disposed at a position of the second heat radiation member corresponding to the first through hole and the second through hole, and the support member, the substrate, and the second heat radiation member are fixed to each other with the screw member inserted in the second through hole, the first through hole, and the hole.

According to the configuration of Supplementary Note 11, since the support member, the substrate, and the second heat radiation member are fixed in a lump with the screw member, it is possible to simplify the fixation structure of these members.

Supplementary Note 12

The light source device described in one of Supplementary Note 4 and Supplementary Note 9, wherein in a cross-sectional view crossing a long axis direction of the wavelength conversion member, the support member is smaller in width than the substrate, and the first heat radiation member is smaller in width than the substrate.

According to the configuration of Supplementary Note 12, it is possible to achieve the reduction is size of a portion at the support member side out of the light source device.

Supplementary Note 13

The light source device described in any one of Supplementary Note 1 through Supplementary Note 12, wherein the support member has a recess recessed from the third surface toward the fourth surface, the wavelength conversion member is arranged inside the recess, the recess has a bottom surface having contact with the wavelength conversion member, and a first wall surface and a second wall surface which extend in a direction crossing the bottom surface, and which are opposed to the wavelength conversion member, at least one of the first wall surface and the second wall surface is separated from the wavelength conversion member, and has a tilted surface tilted in a direction along which a distance from the wavelength conversion member increases in a direction from the bottom surface toward the third surface, and the tilted surface reflects at least a part of the first light emitted from the light emitting element.

According to the configuration of Supplementary Note 13, the first light emitted from the light emitting element and entering a gap between one of the first wall surface and the second wall surface and the wavelength conversion member is reflected by the tilted surface, and thus, becomes easy to enter the wavelength conversion member. Thus, it is possible to increase the use efficiency of the first light.

Supplementary Note 14

A projector including the light source device described in any one of Supplementary Note 1 through Supplementary Note 13, a light modulation device configured to modulate the light emitted from the light source device in accordance with image information, and a projection optical device configured to project the light modulated by the light modulation device.

According to the configuration of Supplementary Note 14, it is possible to realize a projector high in efficiency and small in size.

What is claimed is:

1. A light source device comprising:

a light emitting element which emits first light having a first wavelength band;

a substrate having a first surface on which the light emitting element is arranged, and a second surface located at an opposite side to the first surface;

a wavelength conversion member which includes a phosphor, and which is configured to convert the first light emitted from the light emitting element into second light having a second wavelength band different from the first wavelength band;

a support member having a third surface having contact with the first surface of the substrate, and a fourth surface located at an opposite side to the third surface, and configured to support the wavelength conversion member;

a fixation member configured to fix the support member to the substrate; and a spacer member having contact with each of the substrate and the wavelength conversion member to hold the light emitting element and the wavelength conversion member at positions separated from each other, wherein the fixation member is configured including an elastic member, and is configured to fix the support member to the substrate in a state of pressing the third surface toward the first surface;

the first surface of the substrate is provided with a hole, a through hole penetrating the support member in a direction crossing the third surface is disposed at a position of the support member corresponding to the hole of the substrate, the fixation member includes a screw member to be inserted in the through hole and the hole, and an elastic member intervening between a head of the screw member and the support member, and the fixation member fixes the support member to the substrate in a state in which the elastic member is compressed.

2. The light source device according to claim 1, wherein the fixation member is formed of a plate-like member having contact with at least a part of an outer surface except the third surface of the support member, and is configured to fix the support member to the substrate in a state in which the elastic member is stretched.

3. The light source device according to claim 2, wherein a groove is disposed at a position in the fourth surface where the plate-like member has contact with the support member, the plate-like member is arranged inside the groove, and a depth of the groove is larger than a thickness of the plate-like member.

4. The light source device according to claim 3, further comprising:

a first heat radiation member which has contact with the fourth surface, and to which heat of the support member is transferred.

5. The light source device according to claim 4, wherein in a cross-sectional view crossing a long axis direction of the wavelength conversion member, the support member is smaller in width than the substrate, and the first heat radiation member is smaller in width than the substrate.

6. The light source device according to claim 2, further comprising:

a second heat radiation member which has contact with the second surface of the substrate, and to which heat of the substrate is transferred.

7. The light source device according to claim 6, wherein the second heat radiation member is provided with a hole, a first through hole penetrating the substrate in a direction crossing the first surface and the second surface is disposed at a position of the substrate corresponding to the hole of the second heat radiation member, a second through hole penetrating the plate-like member in a thickness direction is disposed at a position of the plate-like member corresponding to the hole of the second heat radiation member, and the plate-like member, the substrate, and the second heat radiation member are fixed to each other with a screw member inserted in the second through hole, the first through hole, and the hole.

8. The light source device according to claim 1, wherein the support member has a main body configured to support the wavelength conversion member, and an attachment part which extends along the third surface, and which is thinner in thickness than the main body, and the through hole is disposed in the attachment part.

9. The light source device according to claim 1, further comprising:

a first heat radiation member which has contact with the fourth surface of the support member, and to which heat of the support member is transferred.

10. The light source device according to claim 1, further comprising:

a second heat radiation member which has contact with the second surface of the substrate, and to which heat of the substrate is transferred.

11. The light source device according to claim 10, wherein the hole of the substrate is a first through hole penetrating the substrate in a direction crossing the first surface and the second surface, the through hole of the support member is a second through hole, a hole is disposed at a position of the second heat radiation member corresponding to the first through hole and the second through hole, and the support member, the substrate, and the second heat radiation member are fixed to each other with the screw member inserted in the second through hole, the first through hole, and the hole.

12. The light source device according to claim 1, wherein the support member has a recess recessed from the third surface toward the fourth surface, the wavelength conversion member is arranged inside the recess, the recess has a bottom surface having contact with the wavelength conversion member, and a first wall surface and a second wall surface which extend in a direction crossing the bottom surface, and which are opposed to the wavelength conversion member, at least one of the first wall surface and the second wall surface is separated from the wavelength conversion member, and has a tilted surface tilted in a direction along which a distance from the wavelength conversion member increases in a direction from the bottom surface toward the third surface, and the tilted surface reflects at least a part of the first light emitted from the light emitting element.

13. A projector comprising:

the light source device according to claim 1;

a light modulation device configured to modulate the light emitted from the light source device in accordance with image information; and a projection optical device configured to project the light modulated by the light modulation device.

14. A light source device comprising:

a light emitting element which emits first light having a first wavelength band;

a substrate having a first surface on which the light emitting element is arranged, and a second surface located at an opposite side to the first surface;

a wavelength conversion member which includes a phosphor, and which is configured to convert the first light emitted from the light emitting element into second light having a second wavelength band different from the first wavelength band;

a support member having a third surface having contact with the first surface of the substrate, and a fourth surface located at an opposite side to the third surface, and configured to support the wavelength conversion member;

a fixation member configured to fix the support member to the substrate; and a spacer member having contact with each of the substrate and the wavelength conversion member to hold the light emitting element and the wavelength conversion member at positions separated from each other, wherein the fixation member is configured including an elastic member, and is configured to fix the support member to the substrate in a state of pressing the third surface toward the first surface; and the fixation member is formed of a plate-like member having contact with at least a part of an outer surface except the third surface of the support member, and is configured to fix the support member to the substrate in a state in which the elastic member is stretched.

15. The light source device according to claim 14, wherein a groove is disposed at a position in the fourth surface where the plate-like member has contact with the support member, the plate-like member is arranged inside the groove, and a depth of the groove is larger than a thickness of the plate-like member.

16. The light source device according to claim 15, further comprising:

a first heat radiation member which has contact with the fourth surface, and to which heat of the support member is transferred.

17. The light source device according to claim 14, further comprising:

a second heat radiation member which has contact with the second surface of the substrate, and to which heat of the substrate is transferred.

18. The light source device according to claim 17, wherein the second heat radiation member is provided with a hole, a first through hole penetrating the substrate in a direction crossing the first surface and the second surface is disposed at a position of the substrate corresponding to the hole of the second heat radiation member, a second through hole penetrating the plate-like member in a thickness direction is disposed at a position of the plate-like member corresponding to the hole of the second heat radiation member, and the plate-like member, the substrate, and the second heat radiation member are fixed to each other with a screw member inserted in the second through hole, the first through hole, and the hole.

19. The light source device according to claim 14, wherein the first surface of the substrate is provided with a hole, a through hole penetrating the support member in a direction crossing the third surface is disposed at a position of the support member corresponding to the hole of the substrate, the fixation member includes a screw member to be inserted in the through hole and the hole, and an elastic member intervening between a head of the screw member and the support member, and the fixation member fixes the support member to the substrate in a state in which the elastic member is compressed.

20. A projector comprising:

the light source device according to claim 14;

a light modulation device configured to modulate the light emitted from the light source device in accordance with image information; and a projection optical device configured to project the light modulated by the light modulation device.

* * * * *